(12) United States Patent
Bell et al.

(10) Patent No.: US 11,182,762 B1
(45) Date of Patent: Nov. 23, 2021

(54) SYNCHRONIZING OPEN TICKET FUNCTIONALITY WITH KITCHEN DISPLAY SYSTEMS

(71) Applicant: Square, Inc., San Francisco, CA (US)

(72) Inventors: Bruce Bell, New York, NY (US); Nelson Crespo, San Francisco, CA (US); Mathew Wilson, Sausalito, CA (US); William Rocklin, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 159 days.

(21) Appl. No.: 16/383,375

(22) Filed: Apr. 12, 2019

Related U.S. Application Data

(63) Continuation of application No. 15/185,354, filed on Jun. 17, 2016, now Pat. No. 10,311,420.

(51) Int. Cl.
| | |
|---|---|
| *G06Q 20/20* | (2012.01) |
| *G06F 16/23* | (2019.01) |
| *G06F 16/951* | (2019.01) |
| *G06F 16/248* | (2019.01) |
| *G06F 3/0484* | (2013.01) |
| *G06Q 30/06* | (2012.01) |
| *G06F 3/0482* | (2013.01) |
| *G06Q 50/12* | (2012.01) |
| *G06Q 20/12* | (2012.01) |
| *G06F 16/21* | (2019.01) |

(52) U.S. Cl.
CPC ......... *G06Q 20/202* (2013.01); *G06F 3/0482* (2013.01); *G06F 3/0484* (2013.01); *G06F 16/219* (2019.01); *G06F 16/2358* (2019.01); *G06F 16/248* (2019.01); *G06F 16/951* (2019.01); *G06Q 20/12* (2013.01); *G06Q 30/0635* (2013.01); *G06Q 50/12* (2013.01)

(58) Field of Classification Search
CPC .. G06Q 20/202; G06Q 20/12; G06Q 30/0635; G06Q 50/02
USPC ........................................................ 705/28
See application file for complete search history.

(56) References Cited

U.S. PATENT DOCUMENTS

| | | | |
|---|---|---|---|
| 4,485,300 | A | 11/1984 | Peirce |
| 5,980,089 | A | 11/1999 | Weis |
| 6,373,950 | B1 | 4/2002 | Rowney |
| 6,473,740 | B2 | 10/2002 | Cockrill et al. |

(Continued)

OTHER PUBLICATIONS

Non-Final Office Action dated Jun. 15, 2020, for U.S. Appl. No. 16/053,576, of Renke, C.P., et al., filed Aug. 2, 2018.

(Continued)

*Primary Examiner* — Andrew Joseph Rudy
(74) *Attorney, Agent, or Firm* — Lee & Hayes, P.C.

(57) ABSTRACT

Techniques and arrangements for facilitating synchronization of open ticket functionality utilized by point-of-sale (POS) devices with kitchen display systems. In some example, a POS device associated with a merchant receives customer orders associated with transaction between the merchant and customer(s). The customer orders originate both from user input to the POS device and from an application(s) executing on a separate device. The POS sends the customer orders to a kitchen display system (KDS) associated with the merchant. The KDS aggregates the orders and, responsive to the aggregating, causes presentation of the orders.

20 Claims, 25 Drawing Sheets

(56) References Cited

U.S. PATENT DOCUMENTS

| | | |
|---|---|---|
| 6,727,925 B1 | 4/2004 | Bourdelais |
| 6,732,934 B2 | 5/2004 | Hamilton et al. |
| 6,920,431 B2 | 7/2005 | Showghi et al. |
| 7,071,842 B1 | 7/2006 | Brady, Jr. |
| 7,293,254 B2 | 11/2007 | Bloesch et al. |
| 7,370,794 B2 | 5/2008 | Trane |
| 7,536,307 B2 | 5/2009 | Barnes et al. |
| 7,571,468 B1 | 8/2009 | Williams |
| 7,685,052 B2 | 3/2010 | Waelbroeck et al. |
| 7,748,621 B2 | 7/2010 | Gusler et al. |
| 7,756,745 B2 | 7/2010 | Leet et al. |
| 7,797,204 B2 | 9/2010 | Balent |
| 7,805,382 B2 | 9/2010 | Rosen et al. |
| 7,942,337 B2 | 5/2011 | Jain |
| 7,958,029 B1 | 6/2011 | Bobich et al. |
| 8,069,085 B2 | 11/2011 | Ahlers et al. |
| 8,123,370 B2 | 2/2012 | Maekawa |
| 8,190,483 B2 | 5/2012 | Woycik et al. |
| 8,260,723 B2 | 9/2012 | Carroll |
| 8,370,207 B2 | 2/2013 | Edwards |
| 8,380,177 B2 | 2/2013 | Laracey |
| 8,671,002 B2 | 3/2014 | Stefik et al. |
| 8,676,708 B1 | 3/2014 | Honey |
| 8,688,574 B2 | 4/2014 | Stringfellow et al. |
| 8,694,456 B2 | 4/2014 | Grigg et al. |
| 8,700,659 B2 | 4/2014 | Skeen et al. |
| 8,732,193 B2 | 5/2014 | Skeen et al. |
| 8,738,451 B2 | 5/2014 | Ahlers et al. |
| 8,762,207 B2 | 6/2014 | Kobres |
| 8,799,111 B2 | 8/2014 | Prellwitz et al. |
| 8,831,677 B2 | 9/2014 | Villa-Real |
| 8,856,170 B2 | 10/2014 | Skeen et al. |
| 8,862,504 B2 | 10/2014 | Sobek |
| 8,875,990 B2 | 11/2014 | Bishop et al. |
| 8,885,894 B2 | 11/2014 | Rowen et al. |
| 8,977,567 B2 | 3/2015 | Aabye et al. |
| 9,002,584 B2 | 4/2015 | Van Wiemeersch et al. |
| 9,037,491 B1 | 5/2015 | Lee |
| 9,064,359 B2 | 6/2015 | Lert, Jr. et al. |
| 9,165,298 B2 | 10/2015 | Hayhow |
| 9,195,982 B1 | 11/2015 | Orr et al. |
| 9,218,413 B2 | 12/2015 | Skeen et al. |
| 9,311,639 B2 | 4/2016 | Filler |
| 9,342,823 B2 | 5/2016 | Casares et al. |
| 9,349,108 B2 | 5/2016 | Skeen et al. |
| 9,355,470 B2 | 5/2016 | Merrell et al. |
| 9,390,424 B2 | 7/2016 | Hendrickson |
| 9,409,978 B2 | 8/2016 | Doxsey et al. |
| 9,426,183 B2 | 8/2016 | Shahidzadeh et al. |
| 9,430,784 B1 | 8/2016 | Frederick et al. |
| 9,444,932 B2 | 9/2016 | Ravenel et al. |
| 9,477,995 B2 | 10/2016 | Nathanel et al. |
| 9,515,999 B2 | 12/2016 | Ylonen |
| 9,536,243 B2 | 1/2017 | Khan |
| 9,563,890 B2 | 2/2017 | Zhou |
| 9,569,757 B1 | 2/2017 | Wilson et al. |
| 9,569,768 B2 | 2/2017 | Kean |
| 9,576,285 B2 | 2/2017 | Zhou |
| 9,576,289 B2 | 2/2017 | Henderson et al. |
| 9,582,797 B1 | 2/2017 | Holmes et al. |
| 9,633,344 B2 | 4/2017 | Nathanel et al. |
| 9,666,023 B2 | 5/2017 | Irwin, Jr. |
| 9,734,463 B2 | 8/2017 | Skeen et al. |
| 9,785,930 B1 | 10/2017 | Terra et al. |
| 9,799,028 B2 | 10/2017 | Dickelman |
| 9,799,380 B2 | 10/2017 | Liabraaten |
| 9,811,838 B1* | 11/2017 | Daire .............. G06Q 30/0222 |
| 9,817,646 B1 | 11/2017 | Chen et al. |
| 9,824,233 B2 | 11/2017 | Kaplan et al. |
| 9,824,408 B2 | 11/2017 | Isaacson et al. |
| 9,875,469 B1 | 1/2018 | Chin et al. |
| RE46,731 E | 2/2018 | Woycik et al. |
| 9,922,324 B2 | 3/2018 | Wilson et al. |
| 9,934,784 B2 | 4/2018 | May et al. |
| 9,940,374 B2 | 4/2018 | Orumchian et al. |
| 9,959,529 B1 | 5/2018 | Varma et al. |
| 9,965,755 B2 | 5/2018 | Richelson et al. |
| 9,972,003 B2 | 5/2018 | Mooring, II et al. |
| 10,002,397 B2 | 6/2018 | Rose |
| 10,007,953 B1 | 6/2018 | Nathoo et al. |
| 10,019,011 B1 | 7/2018 | Green et al. |
| 10,019,149 B2 | 7/2018 | Chirakan et al. |
| 10,019,698 B1 | 7/2018 | Scott et al. |
| 10,026,062 B1 | 7/2018 | Sasmaz et al. |
| 10,031,420 B2 | 7/2018 | Ongayi et al. |
| 10,032,171 B2 | 7/2018 | Yeager |
| 10,043,149 B1* | 8/2018 | Iacono .............. G06Q 30/0607 |
| 10,043,162 B1* | 8/2018 | Renke .............. G06Q 20/045 |
| 10,043,209 B2 | 8/2018 | Cooke et al. |
| 10,055,722 B1 | 8/2018 | Chen et al. |
| 10,068,225 B2 | 9/2018 | Barrett |
| 10,068,272 B1 | 9/2018 | Varma et al. |
| 10,074,148 B2 | 9/2018 | Cashman et al. |
| 10,078,820 B2 | 9/2018 | Renke et al. |
| 10,089,701 B2* | 10/2018 | Harman .............. G06Q 50/12 |
| 10,091,617 B2 | 10/2018 | Chicoine et al. |
| 10,108,951 B2 | 10/2018 | Argue et al. |
| 10,147,130 B2* | 12/2018 | Scholl .............. G06Q 20/202 |
| 10,204,328 B2* | 2/2019 | Argue .............. G06Q 10/08 |
| 10,210,569 B1 | 2/2019 | Kim et al. |
| 10,255,645 B1 | 4/2019 | Christensen et al. |
| 10,275,752 B2 | 4/2019 | Wilson et al. |
| 10,289,991 B1* | 5/2019 | Muller .............. G06Q 20/0457 |
| 10,289,992 B1* | 5/2019 | Bell .............. G06F 7/08 |
| 10,311,420 B1 | 6/2019 | Bell et al. |
| 10,313,383 B2 | 6/2019 | Sommer |
| 10,319,013 B2* | 6/2019 | Moring .............. G06Q 30/0609 |
| 10,319,042 B2 | 6/2019 | Arvapally et al. |
| 10,346,605 B2 | 7/2019 | Narasimhan |
| 10,360,648 B1 | 7/2019 | Rocklin et al. |
| 10,467,559 B1 | 11/2019 | Svenson et al. |
| 10,528,945 B1* | 1/2020 | Renke .............. G06Q 20/14 |
| 10,580,062 B1 | 3/2020 | Abrons et al. |
| 10,607,435 B2* | 3/2020 | Lutnick .............. G07F 17/3262 |
| 10,628,815 B1 | 4/2020 | Woo et al. |
| 10,679,278 B2* | 6/2020 | Harman .............. G06Q 30/0635 |
| 10,740,715 B1* | 8/2020 | Kumar .............. G06Q 10/083 |
| 10,755,349 B1* | 8/2020 | Boates .............. G06Q 20/02 |
| 10,769,710 B2 | 9/2020 | Yang |
| 10,915,905 B1 | 2/2021 | Callender |
| 11,138,680 | 10/2021 | Matoba |
| 2003/0174823 A1 | 9/2003 | Justice et al. |
| 2004/0243468 A1 | 12/2004 | Cohagan et al. |
| 2005/0004843 A1 | 1/2005 | Heflin |
| 2006/0143087 A1 | 6/2006 | Tripp et al. |
| 2006/0178986 A1 | 8/2006 | Giordano et al. |
| 2007/0018041 A1 | 1/2007 | Butler et al. |
| 2007/0235533 A1 | 10/2007 | Giordano |
| 2008/0015987 A1 | 1/2008 | Ramavarjula et al. |
| 2009/0063312 A1 | 3/2009 | Hurst |
| 2009/0083069 A1 | 3/2009 | Tierney et al. |
| 2009/0090783 A1 | 4/2009 | Killian et al. |
| 2009/0192913 A1 | 7/2009 | Saito et al. |
| 2009/0228336 A1 | 9/2009 | Giordano et al. |
| 2009/0240624 A1 | 9/2009 | James et al. |
| 2010/0010906 A1 | 1/2010 | Grecia |
| 2010/0088207 A1 | 4/2010 | McLaughlin et al. |
| 2011/0022472 A1 | 1/2011 | Zon |
| 2011/0087592 A1 | 4/2011 | van der Veen et al. |
| 2011/0215159 A1 | 9/2011 | Jain |
| 2011/0251909 A1 | 10/2011 | Clark |
| 2011/0288967 A1 | 11/2011 | Selfridge |
| 2011/0320345 A1 | 12/2011 | Taveau et al. |
| 2012/0130787 A1 | 5/2012 | Stouffer et al. |
| 2012/0130899 A1 | 5/2012 | McMonagle et al. |
| 2012/0136754 A1 | 5/2012 | Underwood |
| 2012/0173350 A1 | 7/2012 | Robson |
| 2012/0209749 A1 | 8/2012 | Hammad et al. |
| 2012/0330837 A1 | 12/2012 | Persaud et al. |
| 2013/0132274 A1 | 5/2013 | Henderson et al. |
| 2013/0226805 A1 | 8/2013 | Griffin et al. |
| 2013/0238455 A1 | 9/2013 | Laracey |
| 2013/0290172 A1* | 10/2013 | Mashinsky .......... G06Q 20/384 |
| | | 705/39 |

(56) References Cited

U.S. PATENT DOCUMENTS

| | | | |
|---|---|---|---|
| 2014/0052586 A1 | 2/2014 | Weber | |
| 2014/0058902 A1* | 2/2014 | Taylor | G06Q 30/06 705/26.81 |
| 2014/0097241 A1 | 4/2014 | Tovar et al. | |
| 2014/0108237 A1 | 4/2014 | Carretta et al. | |
| 2014/0258011 A1 | 9/2014 | Shore | |
| 2014/0263622 A1 | 9/2014 | Babatz et al. | |
| 2014/0279534 A1 | 9/2014 | Miles | |
| 2014/0330654 A1 | 11/2014 | Turney et al. | |
| 2014/0351130 A1 | 11/2014 | Cheek et al. | |
| 2014/0372300 A1 | 12/2014 | Blythe | |
| 2015/0032567 A1 | 1/2015 | Bhatia | |
| 2015/0095225 A1 | 4/2015 | Appana et al. | |
| 2015/0178712 A1 | 6/2015 | Angrish et al. | |
| 2015/0213565 A1 | 7/2015 | Garrett et al. | |
| 2015/0278789 A1 | 10/2015 | Richelson et al. | |
| 2015/0287006 A1 | 10/2015 | Hunter et al. | |
| 2015/0310408 A1 | 10/2015 | Anderson | |
| 2016/0247113 A1 | 8/2016 | Rademaker | |
| 2016/0267448 A1 | 9/2016 | James et al. | |
| 2016/0307151 A1 | 10/2016 | Grabovski et al. | |
| 2016/0307176 A1 | 10/2016 | Renke et al. | |
| 2016/0335613 A1 | 11/2016 | Laracey | |
| 2016/0353235 A1 | 12/2016 | Williams et al. | |
| 2017/0004475 A1 | 1/2017 | White et al. | |
| 2017/0018041 A1 | 1/2017 | Fox | |
| 2017/0083901 A1 | 3/2017 | Spencer, II | |
| 2017/0124671 A1 | 5/2017 | Tam et al. | |
| 2017/0161851 A1 | 6/2017 | Li et al. | |
| 2017/0193470 A1 | 7/2017 | Renke et al. | |
| 2017/0193543 A1* | 7/2017 | Priebatsch | G06Q 20/3224 |
| 2018/0039965 A1 | 2/2018 | Han et al. | |
| 2018/0089658 A1 | 3/2018 | Bell et al. | |
| 2018/0150868 A1* | 5/2018 | Stone | G06Q 20/06 |
| 2018/0249861 A1 | 9/2018 | Hiatt et al. | |
| 2018/0271322 A1 | 9/2018 | Thai et al. | |
| 2018/0330346 A1 | 11/2018 | Grassadonia et al. | |
| 2018/0341933 A1 | 11/2018 | Renke et al. | |
| 2018/0365663 A1 | 12/2018 | Bell et al. | |
| 2019/0228463 A1 | 7/2019 | Chan et al. | |
| 2020/0273086 A1 | 8/2020 | Abrons et al. | |
| 2020/0364710 A1* | 11/2020 | Varma | G06Q 20/322 |

OTHER PUBLICATIONS

Final Office Action dated Jun. 25, 2020, for U.S. Appl. No. 15/721,474, of Svenson, T., et al., filed Sep. 29, 2017.
Non Final Office Action dated Apr. 23, 2020, for U.S. Appl. No. 16/219,060, of Kyle, Callender, filed Dec. 13, 2018.
Notice of Allowance dated Oct. 23, 2019, for U.S. Appl. No. 15/195,557, of Abrons, A., et al., filed Jun. 28, 2016.
Non Final Office Action dated Dec. 12, 2019, for U.S. Appl. No. 15/721,474, of Svenson, T., et al., filed Sep. 29, 2017.
Mercury, "Bar Tabs and Credit Cards: The Mixology for POS Developers," Credit Card Acceptance Procedures When Supporting Bar Tabs, pp. 1-9 (May 29, 2014).
Non-Final Office Action dated Jun. 25, 2015, for U.S. Appl. No. 14/675,555, of Renke, C.P., et al., filed Mar. 31, 2015.
Final Office Action dated Dec. 31, 2015, for U.S. Appl. No. 14/675,555, of Renke, C.P., et al., filed Mar. 31, 2015.
Non Final Office Action dated Dec. 16, 2016, for U.S. Appl. No. 14/675,555, of Renke, C.P., et al., filed Mar. 31, 2015.
Non Final Office Action dated Jan. 18, 2017, for U.S. Appl. No. 14/675,565, of Renke, C.P., et al., filed Mar. 31, 2015.
Final Office Action dated Jul. 26, 2017, for U.S. Appl. No. 14/675,555, of Renke, C.P., et al., filed Mar. 31, 2015.
Advisory Action dated Nov. 8, 2017, for U.S. Appl. No. 14/675,555, of Renke, C.P., et al., filed Mar. 31, 2015.
Final Office Action dated Dec. 14, 2017, for U.S. Appl. No. 14/675,565, of Renke, C.P., et al., filed Mar. 31, 2015.
Non Final Office Action dated Feb. 27, 2018, for U.S. Appl. No. 14/675,555, of Renke, C.P., et al., filed Mar. 31, 2015.
Notice of Allowance dated Mar. 29, 2018, for U.S. Appl. No. 14/675,565, of Renke, C.P., et al., filed Mar. 31, 2015.
Non Final Office Action dated Jun. 19, 2018, for U.S. Appl. No. 15/905,643, of Wilson, M., et al., filed Feb. 26, 2018.
Non Final Office Action dated Aug. 14, 2018, for U.S. Appl. No. 15/185,354, of Bell, B., et al., filed Jun. 17, 2016.
Non Final Office Action dated Aug. 15, 2018, for U.S. Appl. No. 15/185,383, of Bell, B., et al., filed Jun. 17, 2016.
Final Office Action dated Sep. 4, 2018, for U.S. Appl. No. 14/675,555, of Renke, C.P., et al., filed Mar. 31, 2015.
Non Final Office Action dated Oct. 2, 2018, for U.S. Appl. No. 15/195,557, of Abrons, A., et al., filed Jun. 28, 2016.
Non Final Office Action dated Oct. 10, 2018, for U.S. Appl. No. 15/189,131, of Rocklin, W., et al., filed Jun. 22, 2016.
Advisory Action dated Nov. 30, 2018, for U.S. Appl. No. 14/675,555, of Renke, C.P., et al., filed Mar. 31, 2015.
Notice of Allowance dated Dec. 11, 2018, for U.S. Appl. No. 15/905,643, of Wilson, M., et al., filed Feb. 26, 2018.
Notice of Allowance dated Dec. 28, 2018, for U.S. Appl. No. 15/185,383, of Bell, B., et al., filed Jun. 17, 2016.
Notice of Allowance dated Jan. 15, 2019, for U.S. Appl. No. 15/185,354, of Bell, B., et al., filed Jun. 17, 2016.
Advisory Action dated Jan. 24, 2019, for U.S. Appl. No. 14/675,555, of Renke, C.P., et al., filed Mar. 31, 2015.
Advisory Action dated Feb. 21, 2019, for U.S. Appl. No. 14/675,555, of Renke, C.P., et al., filed Mar. 31, 2015.
Notice of Allowance dated Mar. 6, 2019, for U.S. Appl. No. 15/189,131, of Rocklin, W., et al., filed Jun. 22, 2016.
Final Office Action dated Mar. 28, 2019, for U.S. Appl. No. 15/195,557, of Abrons, A., et al., filed Jun. 28, 2016.
Advisory Action dated May 29, 2019, for U.S. Appl. No. 15/195,557, of Abrons, A., et al., filed Jun. 28, 2016.
Notice of Allowance dated Jun. 24, 2019, for U.S. Appl. No. 15/721,522, of Svenson, T., et al., filed Sep. 29, 2017.
Non Final Office Action dated Jun. 28, 2019, for U.S. Appl. No. 15/195,557, of Abrons, A., et al., filed Jun. 28, 2016.
Notice of Allowance dated Aug. 14, 2019, for U.S. Appl. No. 14/675,555, of Renke, C.P., et al., filed Mar. 31, 2015.
Notice of Allowance dated Oct. 5, 2020, for U.S. Appl. No. 16/219,060, of Kyle, C., filed Dec. 13, 2018.
Advisory Action dated Oct. 6, 2020, for U.S. Appl. No. 15/721,474, of Svenson, T., et al., filed Sep. 29, 2017.
Notice of Allowance dated Oct. 21, 2020, for U.S. Appl. No. 15/721,474, of Svenson, T., et al., filed Sep. 29, 2017.
Final Office Action dated Dec. 15, 2020, for U.S. Appl. No. 16/053,576, of Renke, C.P., et al., filed Aug. 2, 2018.
Non-Final Office Action dated Sep. 11, 2020 for U.S. Appl. No. 16/198,336, of Matoba, M., filed Nov. 21, 2018.
Final Office Action dated Dec. 17, 2020 for U.S. Appl. No. 16/198,336, of Matoba, M., filed Nov. 21, 2018.
Notice of Allowance dated Jun. 4, 2021 for U.S. Appl. No. 16/198,336, of Matoba, M., filed Nov. 21, 2018.
Notice of Allowance dated Mar. 31, 2021, for U.S. Appl. No. 16/053,576, of Renke, C.P., et al., filed Aug. 2, 2018.

* cited by examiner

SYNCHRONIZING OPEN TICKET FUNCTIONALITY WITH KITCHEN DISPLAY SYSTEMS

This application claims priority to U.S. patent application Ser. No. 15/185,354, filed Jun. 17, 2016, and granted Jun. 4, 2019 as U.S. Pat. No. 10,311,420, which is incorporated herein by reference.

BACKGROUND

In today's commerce, a merchant may utilize a kitchen display system when preparing items (e.g., food items) for customers. For instance, the merchant may take a customer's order using a point-of-sale (POS) device at a front of the merchant's location, and then process the order using the POS device by receiving payment from the customer. After processing the order, the POS device can send the order to the kitchen display system that is located in the kitchen of the merchant's locations. The kitchen display system can receive the order from the POS device and in response, display the order to employees in the kitchen that prepare the order for the customer.

Currently, however, kitchen display systems do not provide merchants with functionality beyond merely displaying customer orders. For instance, after receiving an order from a POS device, a kitchen display system will merely display each of the items from the order that need preparing. This can cause problems for a merchant that utilizes a POS device that includes advanced POS functionality, such as open ticket capabilities. For instance, the kitchen display system will be unable to synchronize with the advanced functionality of the POS device, thus, limiting the capabilities of both the POS device and the kitchen display system.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
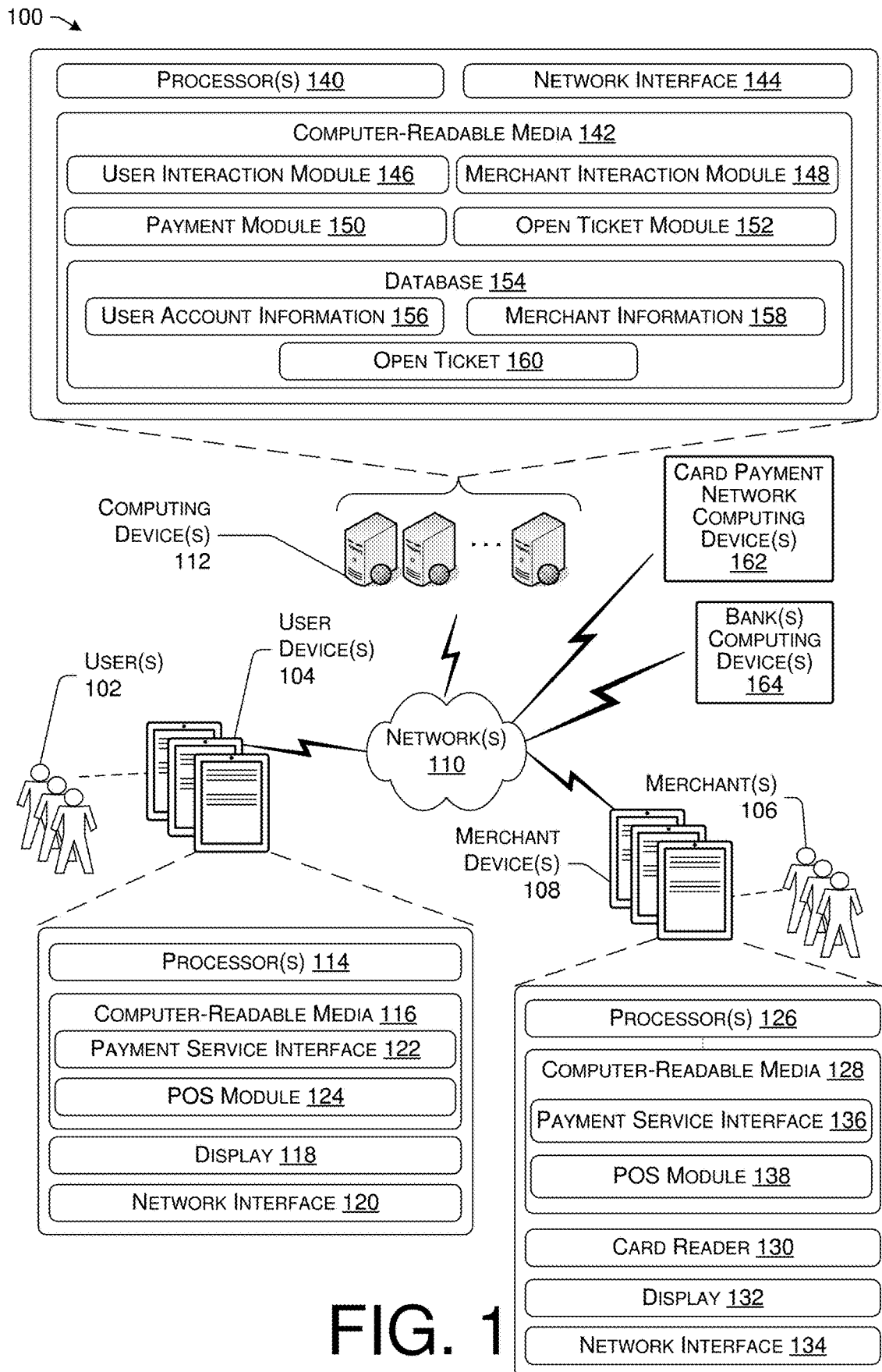
FIG. 1 illustrates an example system for handling open ticket transactions among customers and merchants.

This disclosure describes systems and processes for facilitating synchronization of open ticket functionality utilized by point-of-sale (POS) devices with kitchen display systems. For instance, in some examples, a merchant can utilize a POS device to conduct a transaction with a customer. During the transaction, at a first period of time, the POS device can receive first input corresponding to a first customer order for first items ordered by the customer. Based on receiving the first input, the POS device can create an open ticket for the transaction between the merchant and the customer. For instance, in some examples, the POS device creates the open ticket using POS functionality included on the POS device. The POS device can then add the first customer order to the open ticket. For instance, the POS device can add first information associated with the first items to cart data included in the open ticket.

The POS device can then determine that the first customer order for the transaction associated with the open ticket is complete. For instance, in some examples, the POS can determine that the first customer order is complete based on determining that a threshold amount of time has passed since receiving the first input. Additionally or alternatively, in some examples, the POS can determine that the first customer order is complete based on receiving input indicating that the first order is complete. Based on determining that the first customer order is complete, the POS device can then synchronize with the kitchen display system. For instance, the POS device can send first data associated with the open ticket to kitchen display system. In some examples, the first data can include the first information associated with the first customer order and/or an associated versioning data structure for the open ticket.

The kitchen display system can receive the first data from the POS device. Based on receiving the first data, the kitchen display system can utilize the associated versioning data structure to determine that the open ticket is new (e.g., that the kitchen device has not previously received data associated with the open ticket). For instance, in some examples, since this is the first customer order for the open ticket, the associated versioning data structure may include a count set at zero indicating that there has only been a single order for the open ticket. In response, the kitchen display system can generate (e.g., create) a first order ticket for the open ticket based on the first customer order. In some examples, the first order ticket includes at least an identity of the open ticket, a timer indicating a length of time since the merchant received the first customer order, indications of one or more items from the first items that are in a "in-progress" state (e.g., need to be prepared by the merchant), or the like. The kitchen display system can then provide the first order ticket using a kitchen display user interface.

In some examples, the POS device and the kitchen display system can repeat this synchronization process using additional data associated with the open ticket. For instance, the POS device can receive, at a second period of time, second input corresponding to a second customer order for second items ordered by the customer, add the second customer order to the open ticket, update the associated versioning data structure for the open ticket, determine that the second customer order is complete, and synchronize with the kitchen display system by sending second data associated with the open ticket to the kitchen display system. The kitchen display system can then receive the second data from the POS device, determine that the open ticket has been updated with the second customer order based on the updated associated versioning data structure (e.g., the count may be updated to one), generate a second order ticket for the open ticket based on the second customer order, and provide the second order ticket using the kitchen display user interface.

In some examples, since the POS device and the kitchen display system previously synchronized together using the first data associated with the open ticket, the kitchen display system can utilize the first data when generating additional order tickets (e.g., the second order ticket) for the open ticket. For instance, the first data can include information associated with the customer, such as one or more notes on how the customer likes his or her items prepared, or an indication of a special occasion that the customer is celebrating. The kitchen display system can then use the information when generating each of the additional order tickets for the open ticket. For instance, each of the order tickets for the open ticket can include the information associated with the customer.

In some examples, the kitchen display system further includes advanced functionality for providing order ticket data via a kitchen display user interface. For instance, in some examples, the kitchen display system displays order tickets that are in an "in-progress" state. An order ticket is in an "in-progress" state when the order ticket includes at least one item that is still "in-progress" of being prepared by the merchant. As such, in some examples, while displaying the order tickets, the kitchen display system can receive input that one or more of the order tickets is complete. Based on receiving the input, the kitchen display system can remove the one or more order tickets from the kitchen display user interface. Additionally or alternatively, in some examples, while displaying the order tickets, the kitchen display system can receive input that one or more items within an order ticket is complete. Based on receiving the input, the kitchen display system can add an indication to the one or more items that indicates that the one or more items are complete, or remove the one or more items from the order ticket.

In some examples, the kitchen display system can further provide an in flight interface, via the kitchen display user interface, that includes a list of items from the order tickets that are currently in an "in-progress" state. For instance, the kitchen display system can generate the list of items by: (1) identifying items from the order tickets that are currently in an "in-progress" state, (2) determining, for each of the identified items, an item category, and (3) combining the identified items according to the item categories. In some examples, before providing the list of items, the kitchen display system first ranks items within the list of items. For instance, the kitchen display system ranks items within the list of items based on the item categories, a number of items included in each of the item categories, preparation times associated with the items, or the like. The kitchen display system then provides the list of items using the in flight interface of the kitchen display user interface.

FIG. 1 illustrates an example system 100 for handling open ticket transactions among customers and merchants. More particularly, FIG. 1 provides a framework for providing synchronization of open ticket functionality utilized by POS devices with kitchen display systems. In some examples, each of the merchant devices of FIG. 1 can include different hardware and/or software based on a type of merchant device (e.g., a POS device, kitchen display system, and/or counter device).

As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116, a display 118 and a network interface 120. The computer-readable media 116 may store a payment service interface 122 and a POS module 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS module 138. The computing device(s) 112 may also include one or more processor(s) 140, computer-readable media 142 and a network interface 144. The computer readable media 142 may store a user interaction module 146, a merchant interaction module 148, a payment module 150, an open ticket module, and a database 154.

In some implementations, one of the users 102 may operate a user device 104 to perform various functions associated with the user device 104. For example, a user of the user(s) 102 may utilize the user device 104, and particularly the payment service interface 122 thereof, to interact with the computing device(s) 112 via the network interface 120 to establish a user account with the payment service of the computing device(s) 112. In addition, a user of the user(s) 102 may utilize POS module 124 of the user device 104 to interface with the POS module 138 of the merchant device(s) 108, e.g. as part of a transaction using the payment service of the computing device(s) 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing device(s) 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS module 124 of the user device 104 to execute the payment from the user 102 to the merchant 106 through the payment service of the computing device(s) 112. Further, the POS module 138 may control the operation of the card reader 130 to read payment information from credit cards, debit cards, gift cards and the like. Moreover, the POS module 138 may operate to interact with the card payment network computing devices(s) 162 and/or bank(s) computing device(s) 164 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150, the open ticket module 152, and the database 154. The database 154 may store various information including user account information 156, merchant information 158, and open tickets 160.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 154, such as the user account information 156 and merchant information 158 to provide handling of payments between merchants and users. In some implementations, user account information 156 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing device(s) 112. The merchant 106 can interact with the merchant device 108 to process the transaction. In some examples, the service of the computing devise 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing device(s) 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing device(s) 112. The user 102 can create the user account, for example, by interacting with an application of the user device 104 that is configured to perform electronic payment transactions and that may execute on the user device 104 (e.g. the payment service interface 122). When creating an electronic payment account with the service of the computing device(s) 112, the user 102 may provide an image including the face of the user, data describing a financial account of the user 102 (e.g., a credit card number, expiration date), and a billing address. This user information can be securely stored by the computing device(s) 112, for example, in the user account information 156 in the database 154. Further, the user account information 156 may be created for each user 102, which may include information about the user and transactions conducted by the user.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from users will be deposited. This merchant information 158 can be securely stored by the service, for example, in the database 154 along with the user account information 156. Further, a merchant profile may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment module 150 may be configured to send and receive data to and from the user device 104 and the merchant device 108. For example, the payment module 150 can be configured to send information describing merchants to an application on the user device 104 using, for example, the information stored in the database 154. For example, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant.

Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108.

The computing device(s) 112 can also be configured to communicate with one or more card payment network computing devices(s) 162 of a card payment network (e.g., MasterCard®, VISA®) over the one or more networks 110 to conduct financial transactions electronically. The computing device(s) 112 can also communicate with one or more bank computing devices 164 of one or more banks over the one or more networks 110. For example, the computing device(s) 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 162 of a card payment network and the bank computing devices 164 when processing transactions for payment instruments that do not involve the payment service of the computing device(s) 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing device(s) 112 indicating that the user 102 has checked in with the merchant 106. In response, the computing device(s) 112 can communicate data to notify the merchant device 108 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing device(s) 112. In response, the computing device(s) 112 can obtain, for example, from the user account information 156, data describing a financial account associated with the electronic purchase account of the user 102 to which the total amount will be charged.

The computing device(s) 112 can then communicate with the card payment network computing devices(s) 162 of a card payment network to complete an electronic payment transaction for the total amount to be charged to user's electronic payment account. Once the electronic payment transaction is complete, the computing device(s) 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

In some examples, a POS module 138 of a first merchant device 108 may provide the merchant 108 with open ticket functionality. For instance, the first merchant device 108 can utilize the POS module 138 to create an open ticket for a transaction between a merchant 106 and a user 102. In some examples, the open ticket can correspond to a data structure that stores information associated with interactions between the merchant 106 and the user 102 during a course of a transaction. The interactions can include an identity of the merchant 106, a location of the merchant 106, an identity of the user 102, items order by the user 102 during the transaction (e.g., cart information), a cost associated with each of the items, a cost associated with the open ticket, or other information associated with the user 102.

After creating the open ticket, and during the course of the transaction, the first merchant device 108 can further utilize the POS module 138 to update the data structure for the open ticket by adding (e.g., storing) additional information associated with interactions between the merchant 108 and the user 102 in the data structure. For instance, open ticket data structures described herein may be generated and maintained using some or all of the techniques described in U.S. patent application Ser. No. 14/686,381, filed on Apr. 14, 2015 and entitled "Open Ticket Payment Handling with Offline Mode", and U.S. patent application Ser. No. 14/871,776, filed Sep. 30, 2015, entitled "Anticipatory Creation of Point-Of-Sale Structures," which are incorporated herein by reference in its entirety.

In some examples, each time the first merchant device 108 creates and/or updates the open ticket, the first merchant device 108 can synchronize with at least a second merchant device 108 using data associated with the open ticket. For instance, at a first period of time, the first merchant device 108 can add first information associated with a first customer order for the transaction to the open ticket. The first merchant device 108 can then determine that the first customer order is complete and, in response, send first data (e.g., information about the first customer order, an associated data structure, etc.) associated with the open ticket to the second merchant device 108.

Later, at a second period of time, the first merchant device 108 can add second information associated with a second customer order for the transaction to the open ticket. The first merchant device 108 can then determine that the second customer order is complete and, in response, send second data (e.g., information about the second customer order, an updated associated data structure, etc.) associated with the open ticket to the second merchant device 108. In some examples, the first merchant device 108 continues to synchronize with the second merchant device 108 at given time intervals and/or each time the open ticket is updated.

The second merchant device 108 may include a kitchen display system that provides order tickets for the merchant. For instance, in some examples, the second merchant device 108 may not include at least the POS module 138 for processing transactions using the computing device(s) 112. In such examples, rather than processing transactions for the merchant 106, the second merchant device 108 can receive the data associated with the open ticket from the first merchant device 108, create order tickets for the open ticket using the received data, and provide the created order tickets for the open ticket via a kitchen display user interface.

For instance, the second merchant device 108 can receive the first data associated with the open ticket from the first merchant device 108. The second merchant device 108 can determine that the open ticket is new based on an associated data structure included within the first data, which may include a count of zero. The second merchant device 108 can then create an order ticket for the open ticket using the first data. For instance, the second merchant device 108 can utilize the first data to create an order ticket that includes an identity of the open ticket, an identity of the customer, indications of one or more items from the first customer order that are in an "in-progress" state, or the like. The second merchant device 108 can then display the first order ticket via the kitchen display user interface.

Additionally, the second merchant device 108 can receive the second data associated with the open ticket from the first merchant device 108. The second merchant device 108 can determine that the open ticket has been updated based on the associated data structure included within the second data. For instance, in some examples, the associated data structure may include a count of one, indicating that the open ticket has been updated once since the open ticket was created. The second merchant device 108 can then utilize the first data and/or the second data to create a second order ticket that includes the identity of the open ticket and the identity of the customer. The second merchant device 108 can further utilize the second data to add indications of one or more items from the second customer order that are in the "in-progress" state to the second order ticket. After creating the second order ticket, the second merchant device 108 can display the second order ticket via the kitchen display user interface.

In some examples, the second merchant device 108 can further synchronize with the first merchant device 108 at given time intervals and/or after receiving input. For instance, the second merchant device 108 can receive input indicating that one or more order tickets and/or one or more items on an order ticket are complete. In response, the second merchant device 108 can send data to the first merchant device 108 that indicates that the one or more order tickets and/or the one or more items are complete. In some examples, the first merchant device 108 can receive the data from the second merchant device 108 and update the open ticket based on the input. For instance, the first merchant device 108 can add an indication to the open ticket that items are complete.

It should be noted that, in some examples, the first merchant device 108 and the second merchant device 108 can utilize the computing device(s) 112 to synchronize open ticket functionality of the first merchant device 108 with the kitchen display system of the second merchant device 108. For instance, the first merchant device 108 can send first cart information associated with the first customer order to the computing device(s) 112. In response, the computing device(s) 112 can utilize the open ticket module 152 to both generate an open ticket 160 for the transaction, and add first information associated with the first customer order to the open ticket 160. The computing device(s) 112 can then send the first data associated with the open ticket 160 to the second merchant device 108 so that the second merchant device 108 can create the first order ticket for the open ticket.

Additionally, the first merchant device 108 can send second cart information associated with the second customer order to the computing device(s) 112. In response, the computing device(s) 112 can utilize the open ticket module 152 to add second information associated with the second customer order to the open ticket 160. The computing device(s) 112 can then send the second data associated with the open ticket 160 to the second merchant device 108 so that the second merchant device 108 can create the second order ticket for the open ticket. The first merchant device 108, the second merchant device 108, and the computing device(s) 112 can continue to send and receive data using such a process at given time intervals and/or each time the first merchant device 108 receives an order from the user 102.

Figure 2:
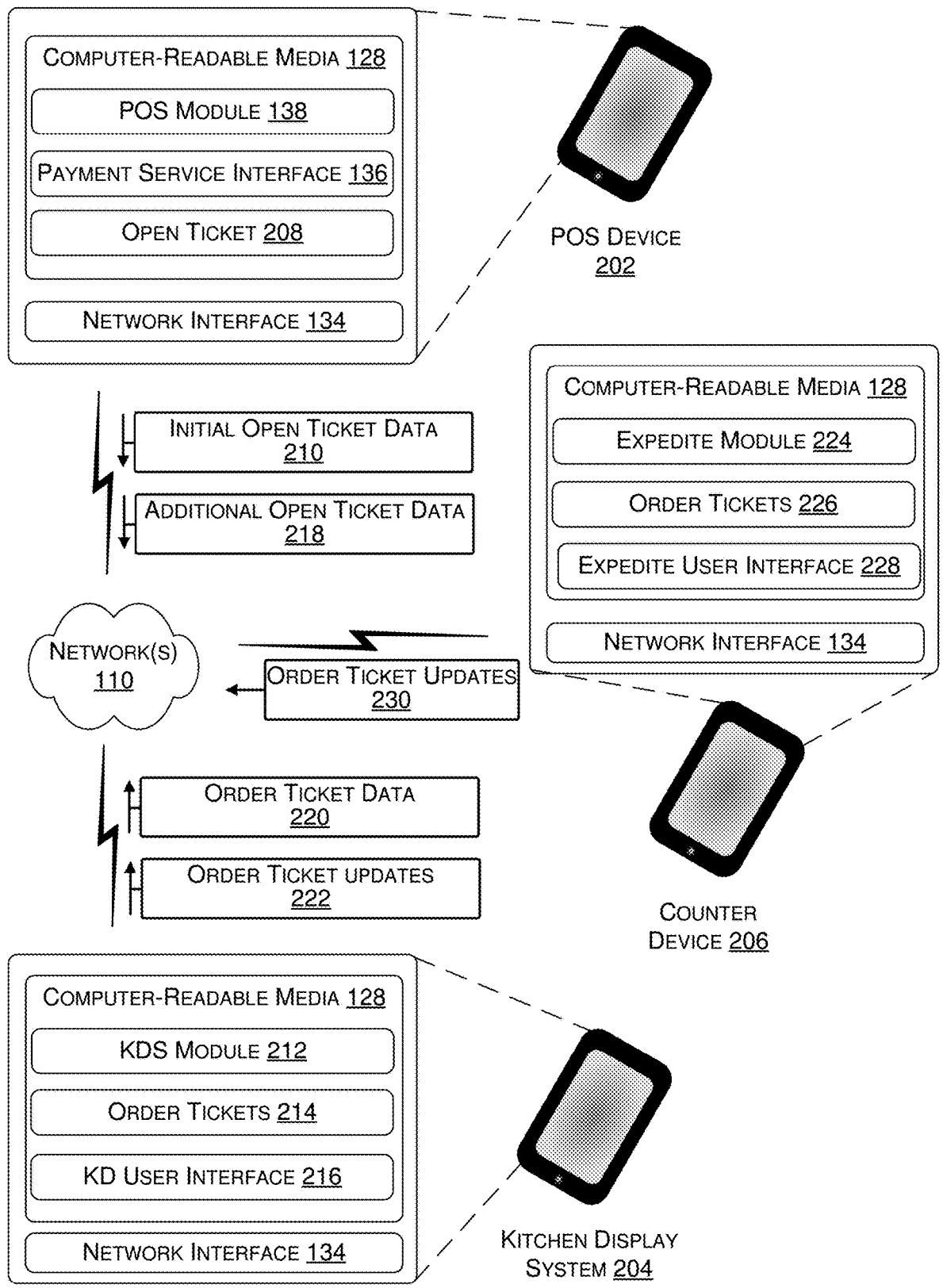
FIG. 2 is an example illustration of merchant devices synchronizing open ticket functionality with kitchen display systems.

FIG. 2 is an example illustration of merchant devices synchronizing open ticket functionality with kitchen display systems. In the example of FIG. 2, a merchant (such as one of merchants 106) may include one or more of a first merchant device 202, a second merchant device 204, and a third merchant device 206, which may each represent one of merchant device(s) 108. The first merchant device 202 can include a point-of-sale (POS) device that includes functionality for processing transactions via a payment service (e.g., computing device(s) 112). The second merchant device 204 can include a kitchen display system that creates and provides order tickets via a kitchen display user interface. Additionally, the third merchant device 206 can include a counter device that provides updates associated with order tickets to the merchant.

In the example of FIG. 2, a merchant can utilize the POS device 202 to input customer orders associated with transactions between the merchant and customers (e.g., users 102). For instance, the POS device 202 can receive first input corresponding to a first customer order associated with a transaction between the merchant and a customer. In some examples, the first customer order includes first items ordered by the customer from the merchant. Based on the first input, the POS device 202 can utilize the POS module 138 to create an open ticket 208 for the transaction.

As discussed above, the open ticket 208 can correspond to a data structure that stores information associated with interactions between the merchant and the customer during the transaction. As such, after generating the open ticket, the POS device 202 can add first information associated with the first customer order to the open ticket 208. In some examples, the first information includes at least an identity of the customer, a list of the first items, special requests made by the customer (e.g., how to prepare the first items, that the customer is celebrating a special occasion, etc.) or the like.

After adding the first customer order to the open ticket 208, the POS device 202 can determine that the first customer order is complete. In some examples, the POS device 202 determines that the first customer order is complete based on determining that a threshold amount of time has passed since receiving the first input. In such examples, the threshold amount of time can include five second, thirty seconds, one minute, or the like. Additionally or alternatively, in some examples, the POS device 202 can determine that the first customer order is complete based on receiving input indicating that the first customer order is complete. In such examples, the input can include a selection of a button (e.g., a "Fire Button") included on a user interface provided by the POS device 202. Based on determining that the first customer order is complete, the POS device 202 can synchronize with the kitchen display system 204 and/or the counter device 206. For instance, the POS device 202 can send initial open ticket data 210 associated with the open ticket 208 to the kitchen display system 204 and/or the counter device 206.

The initial open ticket data 210 can include information associated with the first customer order. For instance, the initial open ticket data 210 can include an identity of the open ticket 208, an identity of the customer, a list of the first items, special requests made by the customer (e.g., how to prepare the first items, that the customer is celebrating a special occasion, etc.), or the like. In some examples, the initial open ticket data 210 can further include an associated versioning data structure associated with the open ticket 208. For instance, since the initial open ticket data 210 is the first data associated with the open ticket 208 sent by the POS device 202, the associated versioning data structure can include a count of zero (and/or any other indicator) indicating that the initial open ticket data 210 corresponds to a new open ticket 208.

In the example of FIG. 2, the kitchen display system 204 can receive the initial open ticket data 210 associated with the open ticket 208 from the POS device 202. The kitchen display system 204 can then utilize the kitchen display module 212 to create a first order ticket 214 for the open ticket 208 using the initial open ticket data 210. In some examples, before creating the first order ticket 214, the kitchen display system 204 uses the associated versioning data structure within the initial open ticket data 210 to determine that the first data is associated with a new open ticket 208. For instance, the kitchen display system 204 can determine that the counter (and/or other indicator) included within the associated versioning data structure is set to zero.

The first order ticket 214 for the open ticket 208 can include one or more of an identity of the open ticket 208, an identity of the customer, indications of the first items, an indication of one or more items from the first items that are in an "in-progress" state, a timer that indicates an amount time since the POS device 202 received the first customer order, special requests made by the customer, or the like. After creating the first order ticket 214, the kitchen display system 204 can provide the first order ticket 214 via a kitchen display (KD) interface 216. For instance, in some examples, the kitchen display system 204 can add the first order ticket 214 to the kitchen display interface 216.

The kitchen display interface 216 can include one or more order tickets 214 that are currently in an "in-progress" state. In some examples, an order ticket is in an "in-progress" state when the order ticket includes at least one item that is currently being prepared, or needs to be prepared, by the merchant. For instance, the kitchen display interface 216 can include the first order ticket 214 along with an indication that the first order ticket 214 is currently in an "in-progress" state. In some examples, the first order ticket 214 includes the "in-progress" state until the kitchen display system receives input indicating that each of the first items have been complete. Based on receiving the input, the kitchen display system 204 can remove the first order ticket 214 from the kitchen display interface 216.

In the example of FIG. 2, the POS device 202 can continue to receive input associated with the transaction, add information to the open ticket 208 based on the input, and synchronize the open ticket 208 with the kitchen display system 204 and/or the counter device 206. For instance, the POS device 202 can receive second input corresponding to a second customer order associated with the transaction. The second customer order can include second items ordered by the customer from the merchant. The POS device 202 can then add second information associated with the second customer order to the open ticket 208. In some examples, the second information can include a list of the second items. The POS device 202 can then determine that the second customer order is complete and based on determining that the second order is complete, synchronize with the kitchen display system 204 and/or the counter device 206.

Synchronizing with the kitchen display system 204 and/or the counter device 206 can include sending additional open ticket data 218 associated with the open ticket 208 to the kitchen display system 204 and/or the counter device 206. The additional open ticket data 218 can include an identity of the open ticket 208, a list of the second items, or the like. In some examples, the additional open ticket data 218 further includes an updated associated versioning data structure associated with the open ticket 208. The updated versioning data structure can include a count greater than zero (e.g., one). For instance, in some examples, the count is based on the number of times the open ticket 208 has been updated by the POS device 202.

The kitchen display system 204 can receive the additional open ticket data 218 from the POS device 202. Based on receiving the additional open ticket data 218, the kitchen display system 204 can determine that the open ticket 208 has been updated with additional items using the updated associated versioning data structure. Additionally, the kitchen display system 204 can utilize the kitchen display module 212 to create a second order ticket 214 for the open ticket 208 using the additional open ticket data 218. The second order ticket 214 can include one or more of the identity of the open ticket 208, the identity of the customer, indications of the second items, an indication of one or more items from the second items that are in an "in-progress" state, a timer that indicates an amount of time since the POS device 202 received the second customer order, the special requests made by the customer, or the like. The kitchen display system 204 can then provide the second order ticket 214 via the kitchen display interface 216.

In the example of FIG. 2, the kitchen display system 204 further synchronizes with the POS device 202 and/or the counter device 206 by sending order ticket data 220 and order ticket updates 222 to the POS device 202 and/or the counter device 206. The order ticket data 220 can include data associated with one or more order tickets 214 that the kitchen display system 204 creates for open tickets. For instance, the order ticket data 220 can include data associated with the first order ticket 214 and the second order ticket 214 that the kitchen display system 204 created using the initial open ticket 210 and the additional open ticket data 218, respectively. In some examples, the kitchen display system 204 sends the order ticket data 220 each time the kitchen display system 204 creates a new order ticket 214. Additionally or alternatively, in some examples, the kitchen display system 204 sends the order ticket data 220 at given time intervals, such as every thirty seconds, minute, five minutes, or the like.

The order ticket updates 222 can include data associated with updates that are made by the kitchen display system 204 to order tickets 214. For instance, and as discussed in detail below, a merchant can use the kitchen display system 204 to update order tickets 214 by performing at least one of (1) completing order tickets 214 and/or items included in order tickets 214, (2) restoring order tickets 214 and/or items included in order tickets 214 that were previously completed, or (3) voiding order tickets 214 and/or items included in an order tickets 214. In some examples, the kitchen display system 204 sends order ticket updates 222 associated with updated order tickets 214 each time the kitchen display system 204 receives input indicating an update. Additionally or alternatively, in some examples, the kitchen display system 204 sends order ticket updates 222 associated with updated order tickets 214 at given time intervals. For instance, the kitchen display system 204 can send the order ticket updates 222 every second, ten seconds, minute, or the like.

The POS device 202 can receive the order ticket data 220 and/or the order ticket updates 222 from the kitchen display system 204 and update open tickets using the data. For instance, in some examples, the POS device 202 can receive order ticket data 220 that includes data indicating that the first order ticket and/or the second order ticket for the open ticket 208 have been created. The POS device 202 can then utilize the POS module 138 to update the open ticket 208 with an indication that the first order ticket and/or the second order ticket were created. Additionally or alternatively, in some examples, the POS device 202 can receive order ticket updates 222 that include data indicating one or more updates (e.g., an item has been completed) to the first order ticket and/or the second order ticket for the open ticket 208. The POS device 202 can then utilize the POS module 138 to update the open ticket 208 to indicate the updates (e.g., that the item has been completed).

In the example of FIG. 2, the counter device 206 can synchronize with the POS device 202 and/or the kitchen display system 204. For instance, the counter device 206 can receive initial open ticket data 210 and additional open ticket data 218 from the POS device 202. The counter device 206 can then utilize expedite module 224 to create order tickets 226 for the open ticket 208 using a similar process as described above as the kitchen display system 204 utilizing the kitchen display module 212. In some examples, the order tickets 226 can include each of the order tickets 214 that are in an "in-progress" state on the kitchen display system 204. Additionally or alternatively, in some examples, the order tickets 226 can further include previous order tickets that were completed by the kitchen display system 204. In some examples, after creating the order tickets 226, the counter device 206 can provide the order tickets 226 via an expedite interface 228.

The counter device 206 can further receive order ticket data 220 and/or order ticket updates 222 from the kitchen display system 204. In some examples, when receiving order ticket data 220 associated with a respective order ticket, the counter device 206 is not required to create the respective order ticket using the expedite module 224. Rather, the counter device 206 provides the respective order ticket via the expedite interface 228. In some examples, when receiving the order ticket updates 222, the counter device 206 utilizes the expedite module 224 to update the order tickets 226. For instance, the counter device 206 can utilize the expedite module 224 to add an indication to an order ticket 226 that indicates that the order ticket 226 is complete.

In some examples, the counter device 206 can further synchronize with the POS device 202 and/or the kitchen display system 204 by sending order ticket updates 230 to the POS device 202 and/or the kitchen display system 204. For instance, and as discussed in detail below, a merchant can use the counter device 206 to update order tickets 226 by performing at least one of (1) completing order tickets 226 and/or items included in order tickets 226, (2) restoring order ticket s 226 and/or items included in order tickets 226 that were previously completed, or (3) voiding order tickets 226 and/or items included in order tickets 226. In some examples, the counter device 206 then sends order ticket updates 230 associated with updated order tickets 226 to the POS device 202 and/or the kitchen display system 204. For instance, in some example, the counter device 206 sends order ticket updates 230 each time the counter device 206 receives input indicating an update. Additionally or alternatively, in some examples, the counter device 206 sends order ticket updates 230 associated with updated order tickets 226 at given time intervals. For instance, the counter device 206 can send the order ticket updates 230 every second, ten seconds, minute, or the like.

In the example of FIG. 2, the POS device 202 can receive the open ticket updates 230 from the counter device 206 and update open tickets based on the order ticket updates 230. For instance, in some examples, the POS device can receive order ticket updates 230 that include data indicating one or more updates (e.g., an item has been completed) to the first order ticket and/or the second order ticket for the open ticket 208. The POS device 202 can then utilize the POS module 138 to update the open ticket 208 to indicate the updates (e.g., that the item has been completed).

The kitchen display system 204 can further receive the order ticket updates 230 from the counter device 206. In response, the kitchen display system 240 can utilize the kitchen display module 212 to update one or more order tickets 214 based on the order ticket updates 230. For instance, if the order ticket updates 230 indicate that a respective order ticket of the order tickets 214 is complete, then the kitchen display system 204 can utilize the kitchen display module 212 to remove the respective order ticket from the kitchen display interface 216. In some examples, removing the respective order ticket includes causing the kitchen display interface 216 to stop displaying the respective order ticket.

It should be noted that, in some examples, the POS device 202 can create order tickets for the open ticket 208. For instance, after receiving the first input, the POS device 202 can create a first order ticket associated with the first customer order using first data from the open ticket 208. The POS device 202 can then send the first order ticket (e.g., as initial open ticket data 210) to the kitchen display system 204 and/or the counter device 206. Next, after receiving the second input, the POS device 202 can create a second order ticket associated with the second customer order using second data from the open ticket 208. The POS device 202 can then send the second order ticket (e.g., as additional open ticket data 218) to the kitchen display system 204 and/or the counter device 206. In some examples, sending order tickets to the kitchen display system 204 and/or the counter device 206 causes the kitchen display system 204 and/or the counter device 206 to provide (e.g., display) the order tickets.

It should further be noted that, in some examples, based on the synchronization capabilities between the merchant devices 202-206, the POS device 202 causes the kitchen display system 204 to create and provide order tickets 214 and/or the counter device 206 to create and provide order tickets 226 based on sending the kitchen display system 204 and the counter device 206 initial open ticket data 210 and additional open ticket data 218. For instance, the POS device 202 can cause the kitchen display system 204 to create and display a first order ticket 214 for the open ticket 208 based on sending the kitchen display system 204 initial open ticket data 210. Additionally, the POS device 202 can cause the kitchen display system 204 to create and display the second order ticket 214 based on sending the kitchen display system 204 additional open ticket data 218.

Moreover, it should be noted that, in some examples, the POS device 202 can send initial open ticket data 210 and additional open ticket data 218 for any number of open tickets. For instance, the POS device 202 can send initial open ticket data 210 associated with a new open ticket each time the POS device 202 generates an open ticket for a transaction between the merchant and a customer. Additionally, the POS device 202 can send additional open ticket data 218 associated with open tickets each time the POS device 202 updates an open ticket for a respective transaction.

Furthermore, it should be noted that the merchant devices 202-206 can synchronize based on switching from an offline mode to an online mode. For instance, the POS device 202 can send the kitchen display system 204 and/or the counter device 206 both initial open ticket data 210 and additional open ticket data 218 based on the POS device 202 switching from an offline mode to an online mode. Additionally, the kitchen display system 204 can send the POS device 202 and/or the counter device 206 both open ticket data 220 and order ticket updates 222 based on the kitchen display system 204 switching from an offline mode to an online mode. Moreover, the counter device 206 can send the POS device 202 and/or the kitchen display system 204 order ticket updates 230 based on the counter device 206 switching from an offline mode to an online mode.

Figure 3:
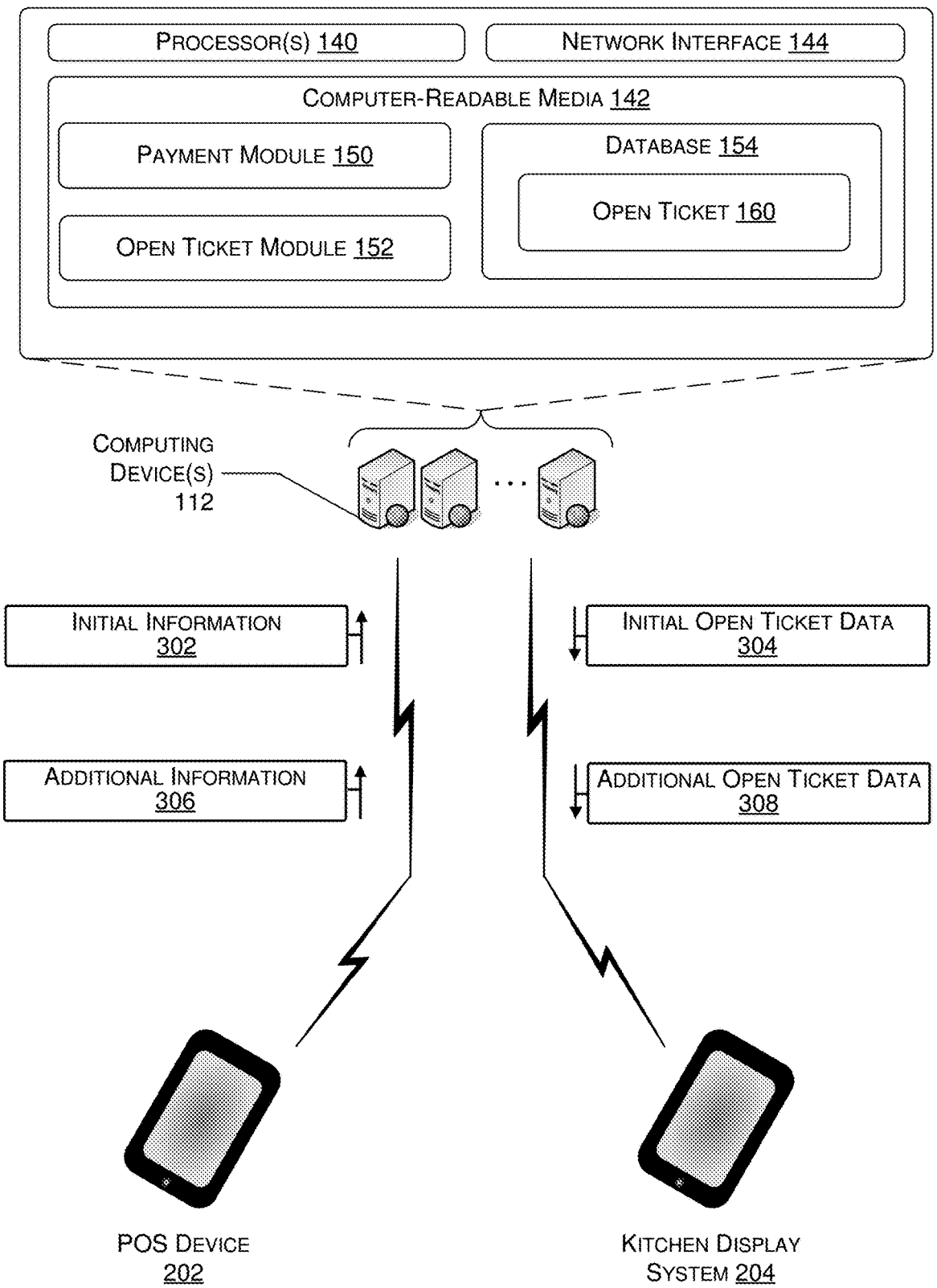
FIG. 3 is an example illustration of a merchant device synchronizing open ticket functionality with a kitchen display system via a third-party service.

FIG. 3 is an example illustration of a merchant device synchronizing open ticket functionality with a kitchen display system via a third-party service. For instance, in some examples, rather than directly sending and receiving communications between the POS device 202 and the kitchen display system 204 to synchronize open ticket functionality with kitchen display systems, the POS device 202 and the kitchen display system 204 communicate through a third-party service, e.g., the computing device(s) 112.

For instance, in the example of FIG. 3, the POS device 202 may receive first input corresponding to a first customer order associated with a transaction between the merchant and a customer. Based on receiving the first input, the POS device 202 can send the computing device(s) 112 initial information 302. The initial information 302 can include data indicating an identity of the merchant, an identity of the customer, cart information (e.g., first items ordered by the customer during the first customer order), a time associated with the first customer order, or the like. The computing device(s) 112 can then receive the initial information 302 from the POS device 202 and utilize the open ticket module 152 to generate an open ticket 160 using the initial information 302. For instance, in some examples, the computing device(s) 112 can generate the open ticket 160 using a similar process as the POS device 202 generating the open ticket 208 as discussed above.

After generating the open ticket 160, the computing device(s) 112 can add first information associated with the first customer order to the open ticket 160. Additionally, the computing device(s) 112 can send the kitchen display system 204 initial open ticket data 304. In some examples, the initial open ticket data 304 can include similar data as the initial open ticket data 210. The kitchen display system 204 can use the initial open ticket data 304 to create a first order ticket for the open ticket 160. For instance, the kitchen display system 204 can create a first order ticket that includes one or more of an identity of the open ticket 160, an identity of the customer, indications of the first items, an indication of one or more items from the first items that are in an "in-progress" state, a timer that indicates an amount time since the POS device 202 received the first customer order, special requests made by the customer, or the like. The kitchen display system 204 can then provide the first order ticket via a kitchen display user interface.

In the example of FIG. 3, the POS device 202 can further receive second input corresponding to a second customer order associated with the transaction between the merchant and the customer. Based on receiving the second input, the POS device 202 can send the computing device(s) 112 additional information 306. The additional information 306 can include data indicating the identity of the merchant, the identity of the customer, additional cart information (e.g., second items ordered by the customer during the second customer order), a time associated with the second customer order, or the like.

The computing device(s) 112 can receive the additional information 306 from the POS device 202. The computing device(s) 112 can then utilize the open ticket module 152 to update the open ticket 160 based on the additional information 306. For instance, in some examples, the computing device(s) 112 can utilize the open ticket module 152 to add the additional cart information associated with the second customer order to the open ticket 160. Additionally, in some examples, the computing device(s) 112 can update an associated versioning data structure of the open ticket 160 in order to indicate that the open ticket 160 was updated with a second customer order.

After updating the open ticket 160, the computing device(s) 112 can send the kitchen display system 204 additional open ticket data 308. In some examples, the additional open ticket data 308 can include similar data as the additional open ticket data 218. The kitchen display system 204 can use the additional open ticket data 308 to create a second order ticket for the open ticket 160. For instance, the kitchen display system 204 can create a second order ticket includes one or more of the identity of the open ticket 160, the identity of the customer, indications of the second items, an indication of one or more items from the second items that are in an "in-progress" state, a timer that indicates an amount time since the POS device 202 received the second customer order, the special requests made by the customer, or the like. The kitchen display system 204 can then provide the second order ticket via the kitchen display user interface.

It should be noted that, in some examples, the kitchen display system 204 can send data back to the computing device(s) 112. For instance, the kitchen display system 204 can send order ticket data 220 and order ticket updates 222 to the computing device(s) 112. The computing device(s) 112 can then use the open ticket data 220 and the order ticket updates 222 to the update open ticket 160 stored on the computing device(s) 112. Additionally, in some examples, the computing device(s) 112 can send the updates to the open ticket 160 to the POS device 202.

It should further be noted that, in some examples, the computing device(s) 112 may further communicate with the counter device 206 when synchronizing open ticket functionality with kitchen display systems. For instance, the computing device(s) 112 can send the initial open ticket data 304 and/or the additional open ticket data 308 to the counter device 206. The counter device 206 can then create order tickets for the open tickets 160 using the initial open ticket data 304 and/or the additional open ticket data 308. Additionally, the computing device(s) 112 can send and receive data associated with updates to the open ticket 160 to the counter device 206.

Finally, it should be noted that, by using the computing device(s) 112 to synchronize open ticket functionality with kitchen display systems, a merchant POS device is not required to include open ticket functionality in order for the POS device to synchronize with the kitchen display system. For instance, in some examples, a POS device may correspond a legacy device that does not include the hardware and/or software to perform open ticket functionality. In such examples, the computing device(s) 112 can generate and update open tickets for the POS device. Utilizing computing device(s) 112 to generate and update open tickets for legacy POS devices is described in U.S. patent application Ser. No. 15/180,734, filed on Jun. 13, 2016, and entitled "Utilizing APIs to Facilitate Open Ticket Synchronization", which is incorporated herein by reference in its entirety.

Figure 4A:
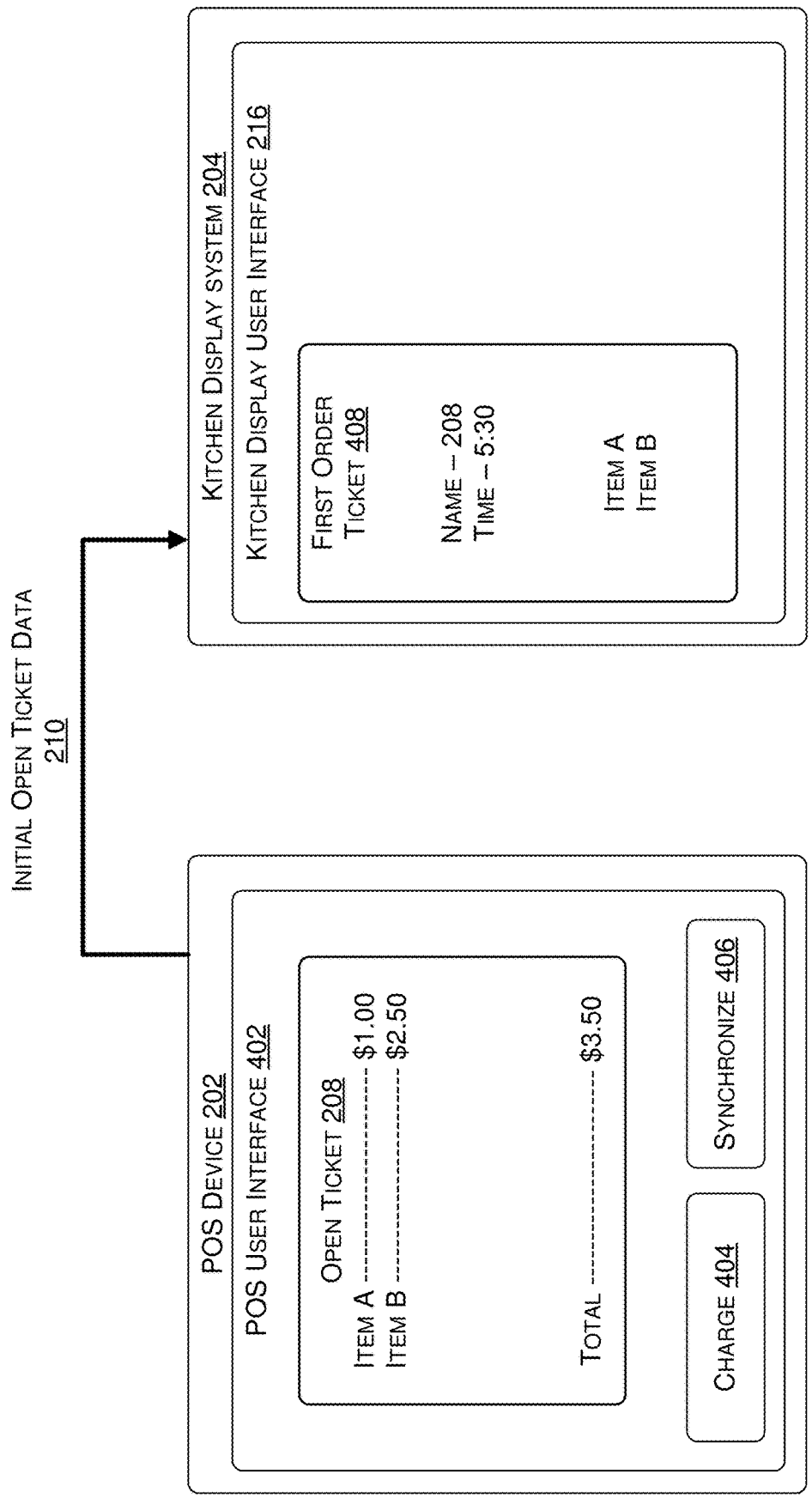
FIGS. 4A-4B are example illustrations of synchronizing an open ticket generated on a POS device with a kitchen display system.
Figure 4B:
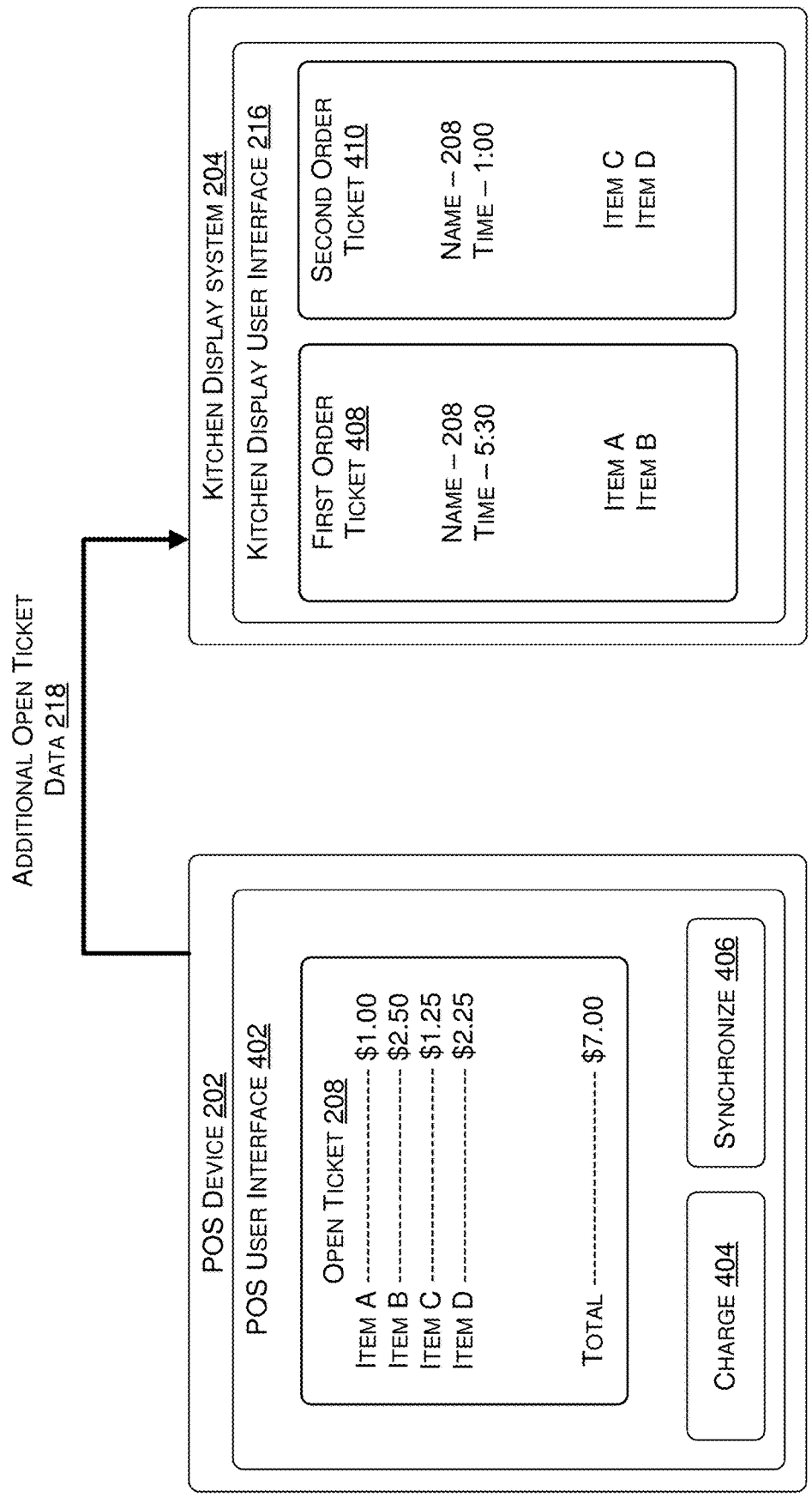

FIGS. 4A-4B are example illustrations of synchronizing an open ticket generated on a POS device with a kitchen display system. For instance, the POS device 202 can provide a POS user interface 402 for inputting customer orders associated with transactions between a merchant and customers. As illustrated in the example illustration of FIG. 4A, the POS user interface 402 includes the open ticket 208, which indicates that two items A-B have been ordered by a customer. The POS interface 402 further includes a charge 404 button that cause the POS device 202 to process the open ticket 208 for the cost of the open ticket 208, and a synchronize button 406 (e.g., a "Fire button") to synchronize the POS device 202 with the kitchen display system 204.

For instance, the POS device 202 can receive input associated with the synchronize button 406. In response, the POS device 202 can send the kitchen display system 204 initial open ticket data 210 associated with the open ticket 208. The kitchen display system 204 can then receive the initial open ticket data 210 from the POS device 202 and use the initial open ticket data 210 to create a first order ticket 408 for the open ticket 208. For instance, and as illustrated in the example illustration of FIG. 4A, the first order ticket 408 for the open ticket 208 includes the name of the open ticket 208, a time since the items A-B were ordered by the customer, and indications of the items A-B. The kitchen display system 204 can then provide the first order ticket 408 via the kitchen display user interface 216.

As illustrated in the example illustration of FIG. 4B, after the kitchen display system 204 generates the first order ticket 408, the POS device 202 can receive input corresponding to a second customer order for the transaction between the merchant and the customer. For instance, the input can indicate that the customer is ordering items C-D from the merchant. In response, the POS device can 202 can update the open ticket 208 to include items C-D. Additionally, the POS device 202 can receive input associated with the synchronize button 406, and send additional open ticket data 218 to the kitchen display system 204 in response.

The kitchen display system 204 can receive the additional open ticket data 218 from the POS device and use the additional open ticket data 218 to create a second order ticket 410 for the open ticket 208. For instance, and as illustrated in the example illustration of FIG. 4B, the second order ticket 410 for the open ticket 208 includes the name of the open ticket 208, a time since the items C-D were ordered by the customer, and indications of the items C-D. The kitchen display system 204 can then provide the second order ticket 410 via the kitchen display interface 216.

It should be noted that, in some examples, the kitchen display system 204 may receive input indicating that the first order ticket 408 is complete before receiving the additional open ticket data 218. In such examples, the kitchen display system 204 can remove the first order ticket 408 from the kitchen display user interface 216. Additionally, after receiving the additional open ticket data 218 and creating the second order ticket 410, the kitchen display system 204 can provide the second order ticket 410 via the kitchen display user interface 216 without providing the first order ticket 408.

Figure 5:
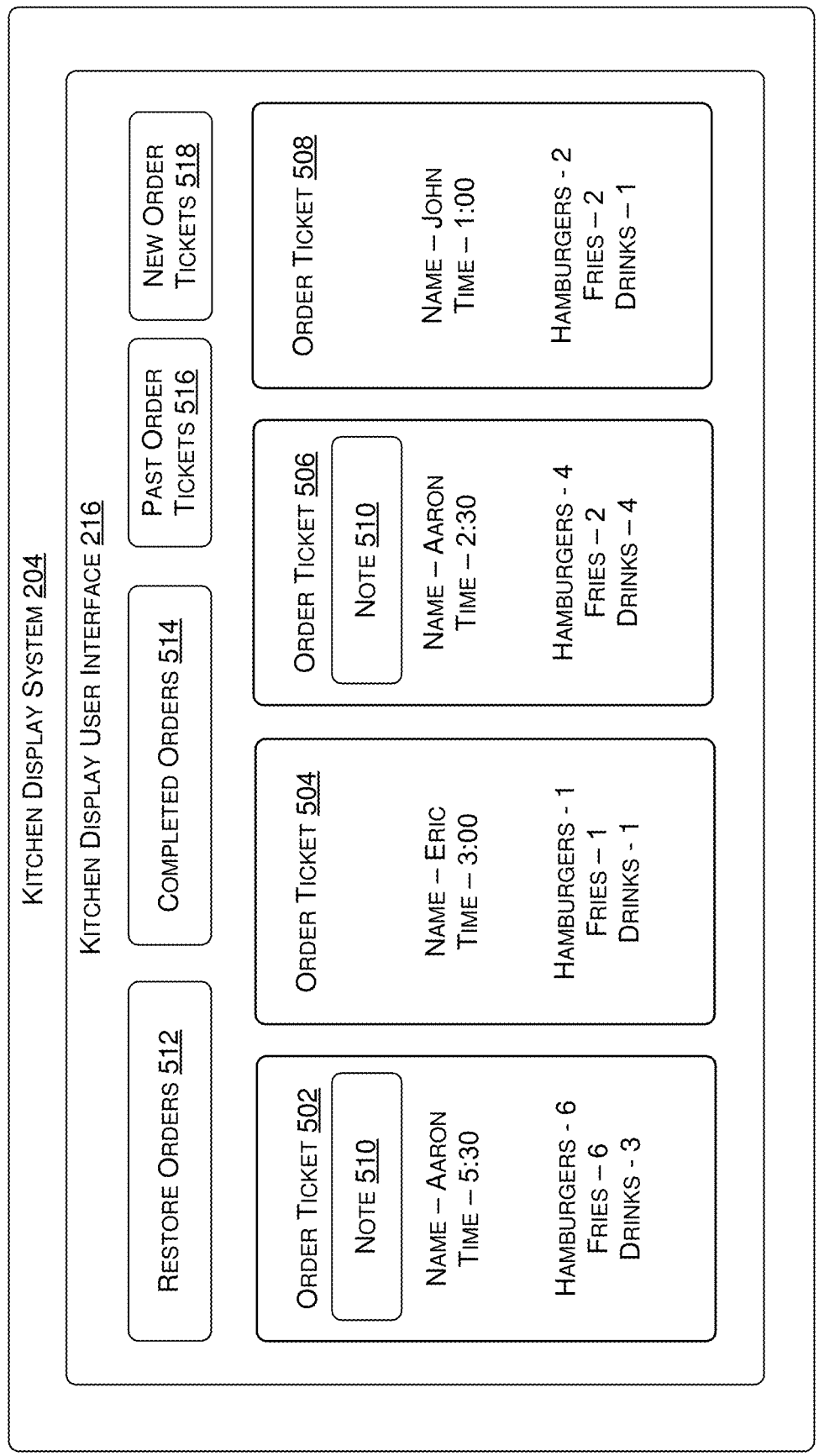
FIG. 5 is an example illustration of a kitchen display system synchronizing order tickets based on open ticket data that the kitchen display system receives from a POS device.

FIG. 5 is an example illustration of a kitchen display system synchronizing order tickets based on open ticket data that the kitchen display system receives from a POS device. In the example of FIG. 5, the kitchen display system 204 provides four order tickets 502-508 via the kitchen display user interface 216. For instance, the kitchen display user interface 216 includes a first order ticket 502 associated with open ticket "Aaron", an order ticket 504 associated with open ticket "Eric", a second order ticket 506 associated with open ticket "Aaron", and an order ticket 508 associated with open ticket "John". In some examples, the kitchen display system 204 may create each of the open tickets 502-508 using data received from a POS device (e.g., POS device 202).

For instance, the kitchen display system 204 may receive, at a first period of time, first data associated with the "Aaron" open ticket. In response, the kitchen display system 204 can then create the first order ticket 502 for the "Aaron" open ticket using the first data. The kitchen display system 204 may then receive, at a second period of time, data associated with the "Eric" open ticket. In response, the kitchen display system 204 can create the order ticket 504 for the "Eric" open ticket using the data associated with the "Eric" open ticket. The kitchen display system 204 may then receive, at a third period of time, second data associated with the "Aaron" open ticket. In response, the kitchen display system 204 can create the second order ticket 506 for the "Aaron" open ticket using the second data. Finally, the kitchen display system 204 may then receive, at a fourth period of time, data associated with the "John" open ticket. In response, the kitchen display system 204 can create the order ticket 508 for the "John" open ticket using the data associated with the "John" open ticket.

In the example of FIG. 5, both the order ticket 502 and order ticket 506 are associated with the open ticket "Aaron". As such, in some examples, the kitchen display system 204 can add similar information (e.g., note 510) to each of the order ticket 502 and the order ticket 506. For instance, at the first period of time, the kitchen display system 204 can receive the first data associated with the open ticket "Aaron". The first data can include both information associated with a first customer order (e.g., first items order by the customer) and specific information associated with the customer. In some examples, the specific information can include a note 510 (e.g., special request) made by the customer. The kitchen display system 204 can then create the order ticket 502 using the first data, where the open ticket includes the note 510.

Later, at the second period of time, the kitchen display system 204 can receive the second data associated with the open ticket "Aaron". In some examples, the second data can include information associated with a second customer order (e.g., second items ordered by the customer), however, the second data may not include the specific information associated with the customer. The kitchen display system 204 can then create the order ticket 506 associated with the open ticket "Aaron" using the second data. Additionally, the kitchen display system 204 can identify that the order ticket 502 is also associated with the open ticket "Aaron", and that the order ticket 502 includes the note 510. Based on identifying that the order ticket 502 includes the note 510, the kitchen display system 204 can add the note 510 to the order ticket 506.

In the example of FIG. 5, the kitchen display user interface 516 further includes a restore orders button 512, a completed orders button 514, a past order tickets button 516, and a new order tickets button 520. The merchant can utilize the restore order button 512 to restore an order ticket and/or an item included in an order ticket that the merchant previously completed. For instance, the kitchen display system 204 may receive first input indicating that the order ticket 502 is complete and based on the first input, remove the order ticket 502 from the kitchen display user interface 216. The kitchen display system 204 may then receive second input associated with the restore orders button 512. Based on receiving the second input, the kitchen display system 204 can add the order ticket 502 back to the kitchen display user interface 216. Additionally, in some examples, the kitchen display system 204 adds an indication with the order ticket 502 that the order ticket 502 was restored.

The completed order button 514 can cause the kitchen display system 504 to provide a list of completed order tickets. In some examples, and as described below with regard to FIGS. 8A-8B, the merchant can use the list of completed order tickets to restore one or more completed order tickets.

The merchant can utilize the past order tickets button 516 and the new order tickets button 518 to search through order tickets that are currently in an "in-progress" state on the kitchen display system 204. For instance, the kitchen display system 204 may provide four order tickets 502-508 using the kitchen display user interface 216 at a single time. However, the kitchen display system 204 may include more than four order tickets that are currently in an "in-progress" state. As such, the kitchen display system 204 can receive input associated with the past order ticket button 516 and provide order tickets that have been in the "in-progress" state for a longer period of time based on the input. For instance, the kitchen display system 204 can advance through the order tickets to provide older order tickets that include the "in-progress" state. Additionally, the kitchen display system 204 can receive input associated with the new order tickets button 518 and provide order tickets that have been in the "in-progress" state for a shorter period of time based on the input. For instance, the kitchen display system 204 can advance through the order tickets to provide newer order tickets that include the "in-progress" state.

It should be noted that, in some examples, the kitchen display system 204 may cause the past order tickets button 516 and/or the new order tickets button 518 to provide an alert for the merchant. In some examples, the alert can include changing the color (e.g., from blue, to orange, to red) of the past order tickets button 516 and/or the new order tickets button 518. In some examples, the alert can include the past order tickets button 516 and/or the new order tickets button 518 blinking a given color (e.g., red).

For instance, an order ticket on the kitchen display user interface 216 may include a first color (e.g., green) based on the time of the order ticket being within a first timing threshold (e.g., 0:00 minutes to 5:00 minutes). Additionally, the order ticket may include a second color (e.g., orange) based on the time of the order ticket being within a second timing threshold (e.g., 5:00 minutes to 10:00 minutes). Furthermore, the order ticket may include a third color (e.g., red) based on the time of the order ticket being over a third threshold (e.g., 10:00 minutes). As such, when an order ticket is within the second threshold and/or over the third threshold, and not currently being displayed via the kitchen display user interface 216, the kitchen display system 204 can cause the past order tickets button 516 and/or the new order tickets button 518 to alert the merchant about the order ticket.

Figure 6:
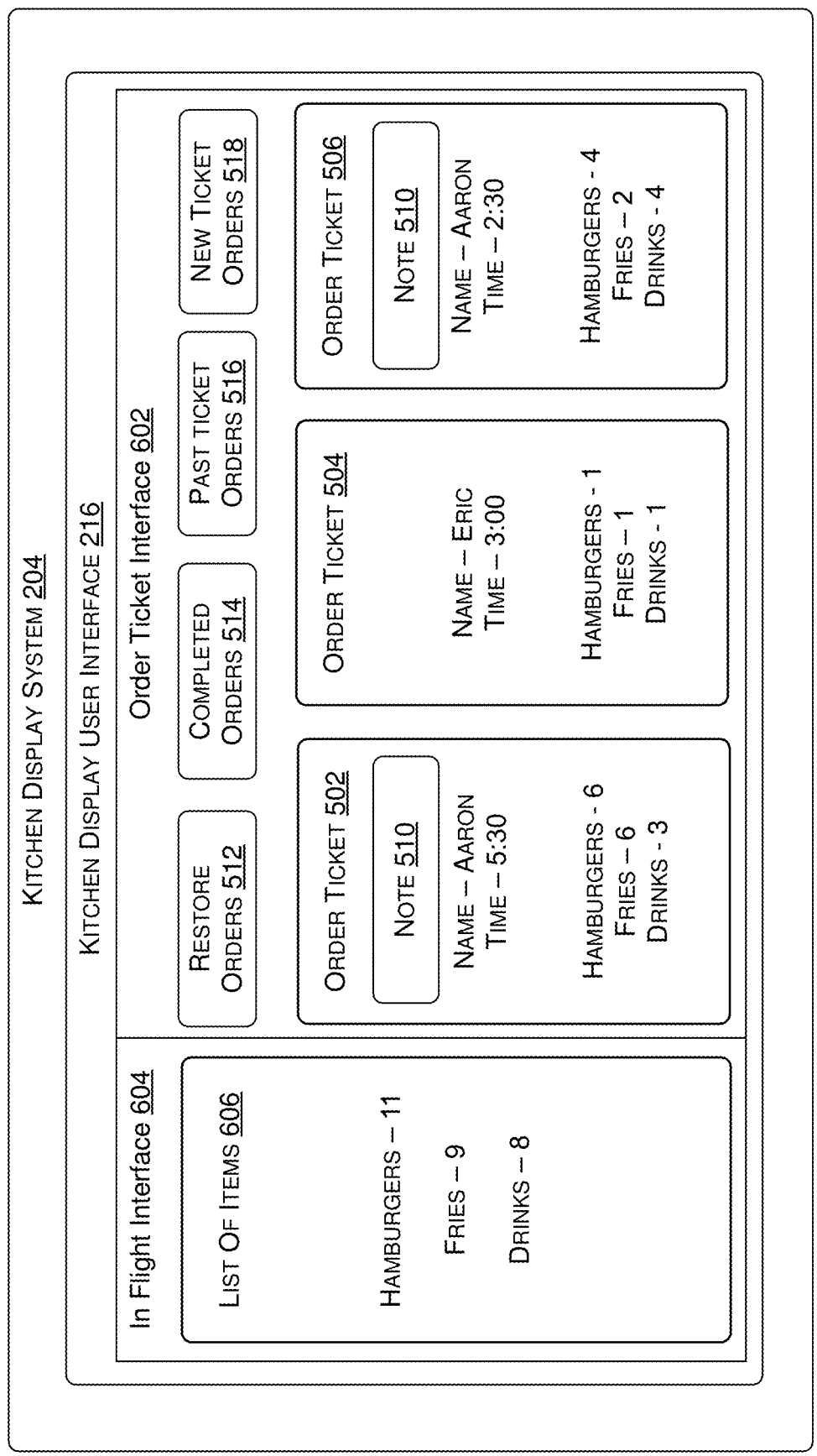
FIG. 6 is an example illustration of a kitchen display system that provides an in flight interface associated with order tickets.

FIG. 6 is an example illustration of a kitchen display system that provides an in flight interface associated with order tickets. In the example of FIG. 6, the kitchen display system 204 is providing a kitchen display user interface 216 that includes both an order ticket interface 602 and an in flight interface 604. The order ticket interface 602 can include one or more order tickets 502-506 that are currently in an "in-progress" state. For instance, each of the order tickets 502-506 includes items (e.g., hamburgers, fries, and drinks) that are in-progress of being prepared by the merchant. For example, the order ticket 502 includes six hamburgers, six fries, and three drinks that are in-progress of being prepared, the order ticket 504 includes one hamburger, one fry, and one drink that are in-progress of being prepared, and the order ticket 506 includes four hamburgers, two fries, and four drinks that are in-progress of being prepared.

The in flight interface 604 can include a list of items 606 from the order tickets 502-506 that are currently in-progress of being prepared. For instance, the list of items 606 for the order tickets 502-506 includes eleven hamburgers, nine fries, and eight drinks that are in-progress of being prepared.

In some examples, the kitchen display system 204 generates the list of items 606 by identifying items from the open tickets 502-506 that in-progress of being prepared, determining an item category for each of the identified items, and then combining the identified item based on the items categories. For instance, in the example of FIG. 6, the kitchen display system 204 can identify that the order ticket 502 includes fifteen items that are in-progress of being prepared, and determine that the fifteen items include six items in the item category "hamburgers", six items in the item category "fries", and three items in the item category "drinks". The kitchen display system 204 can further identify that the order ticket 504 includes three items that are in-progress of being prepared, and determine that the three items include one item in the item category "hamburgers", one item in the item category "fries", and one item in the item category "drinks". Finally, the kitchen display system 204 can identify that the order ticket 506 includes ten items that are in-progress of being prepared, and determine that the ten items include four items in the item category "hamburgers", two items in the item category "fries", and four items in the item category "drinks".

The kitchen display system 204 can then combine the items from order tickets 502-506 based on the item categories (e.g., the item category "hamburgers", the item category "fries", and the item category "drinks") in order to generate the list of items 606. For instance, the kitchen display system 204 can generate the list of items 606 to include twenty-eight items that are in-progress of being prepared, where eleven items are in the item category "hamburgers", nine items are in the item category "fries", and eight items are in the item category "dinks". After generating the list of items 606, the kitchen display system 204 can provide the list of items via the in flight interface 604 of the kitchen display user interface 216.

In some examples, the kitchen display system 204 can rank items included in the list of items 606. For instance, in some examples, the kitchen display system 606 can rank the items included in the list of items 606 based on the item categories (e.g., the item category "hamburgers", the item category "fries", and the item category "drinks"). In some examples, the kitchen display system 606 can rank the items included in the list of items 606 based on a number of items included in each item categories from the item categories. For instance, the kitchen display system 606 can place the item category with the greatest number of items first, the item category with the second greatest number of items second, and so forth in descending order. In some examples, the kitchen display system 204 can rank the items included in the list of items 606 based on preparation times associated the items. For instance, the list of items 606 can include items that include the longest preparation time first, items that include the second longest preparation time second, and so forth in descending order.

In some examples, the kitchen display system 204 can update the list of items 604 based on receiving updates to the order tickets 502-506. For example, the kitchen display system 204 can receive input indicating that the order ticket 502 is complete. Based on the input, the kitchen display system 204 can remove the order ticket 502 from the order ticket interface 602. The kitchen display system 204 can further update the list of item 606 based on the items from the order ticket 502 being complete. For instance, the kitchen display system 204 can update to the list of items 606 to include five items in the item category "hamburgers", three items in the item category "fries", and five items in the item category "drinks".

For another example, the kitchen display system 204 can receive input indicating that one or more items from an order ticket 502-506 are complete. The kitchen display system 204 can then update the list of items 606 based on the input. For instance, the kitchen display system 204 can receive input indicating that three of the hamburgers from the order ticket 502 are complete. Based on the input, the kitchen display system 204 can update the order ticket 502 such that the order ticket 502 includes three items in the item category "hamburgers". Additionally, the kitchen display system 204 can update the list of item 606 such that the list of items 606 includes eight items in the item category "hamburgers", three nine in the item category "fries", and eight items in the item category "drinks".

In some examples, the kitchen display system 204 can update the list of items 606 based on receiving data from other merchant devices. For instance, the kitchen display system 204 can receive data indicating that the order ticket 502 is complete from a counter device (e.g., counter device 206). Based on the receiving the data, the kitchen display system 204 can remove the order ticket 502 from the order ticket interface 602. The kitchen display system 204 can further update the list of item 606 based on the items from the order ticket 502 being complete. For instance, the kitchen display system 204 can update to the list of items 606 to include five items in the item category "hamburgers", three items in the item category "fries", and five items in the item category "drinks".

Additionally, in some examples, the kitchen display system 204 can receive data indicating that one or more items from an order ticket 502-506 are complete from a counter device. The kitchen display system 204 can then update the list of items 606 based on receiving the data. For instance, the kitchen display system 204 can receive data indicating that three of the hamburgers from the order ticket 502 are complete. Based on receiving the data, the kitchen display system 204 can update the order ticket 502 such that the order ticket 502 includes three items in the item category "hamburgers". Additionally, the kitchen display system 204 can update the list of item 606 such that the list of items 606 includes eight items in the item category "hamburgers", three nine in the item category "fries", and eight items in the item category "drinks."

Moreover, the kitchen display system 204 can receive data associated with an open ticket from a POS device (e.g., POS device 202). The kitchen display system 204 can then create a new order ticket for the open ticket using the data, and add the created order ticket to the order ticket interface 602. The kitchen display system 204 can then update the list of items 606 based on one or more items within the created order ticket that are in-progress of being prepared. For instance, since the kitchen display system 204 adds a new order ticket to the order ticket interface 602, the kitchen display system 204 updates the list of items 606 by adding each of the items from the new order ticket that are in-progress of being prepared to the list of items 606.

Figure 7A:
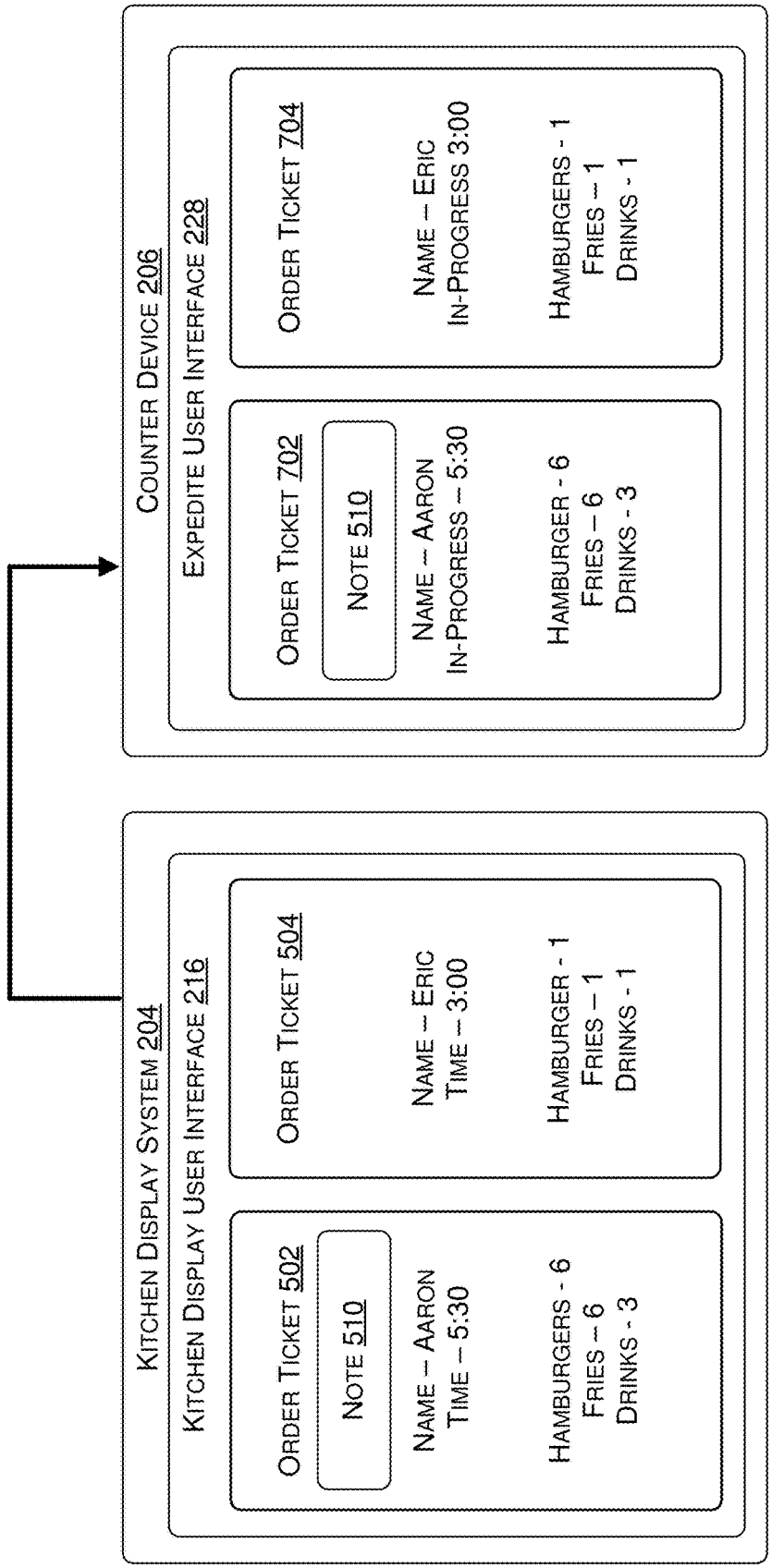
FIGS. 7A-7B are example illustrations of a kitchen display system synchronizing with a counter device.
Figure 7B:
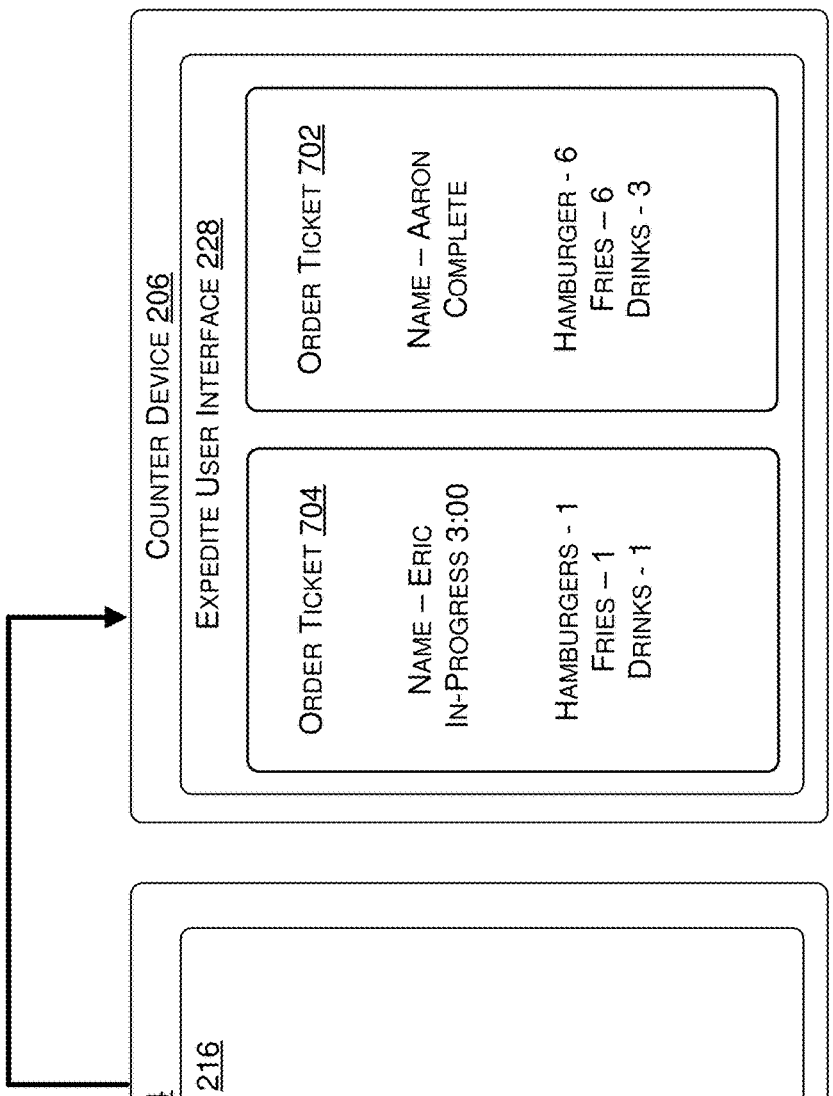
Figure 7B:
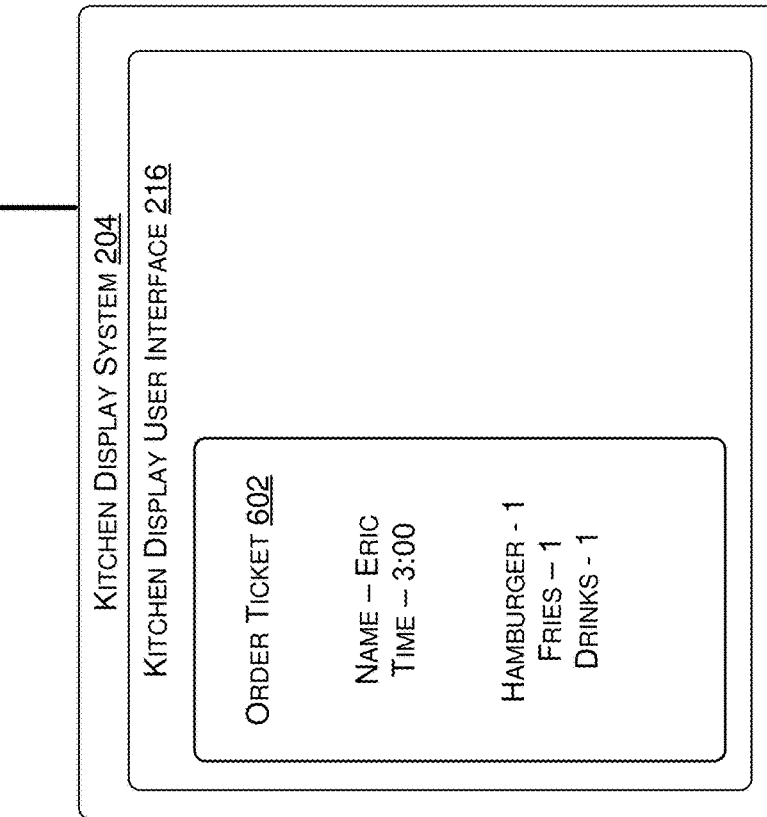

FIGS. 7A-7B are example illustrations of a kitchen display system synchronizing with a counter device. In the example illustration of FIG. 7A, the kitchen display system 204 sends the counter device 206 order ticket data 220 associated with order tickets 502-504. Based on receiving the order ticket data 220 from the kitchen display system 204, the counter device 206 can create order tickets 702-704 using the order ticket data 220. The counter device 206 can then provide the order tickets 702-704 via the expedite user interface 228.

For instance, the counter device 206 can create the order ticket 702 (which is associated with the order ticket 502) using data associated with the order ticket 502 from the order ticket data 220. As such, the order ticket 702 can include one or more of a name of the open ticket that the order ticket 502 was created for, an indication that the order ticket 502 has been in-progress of being prepared for a given time interval (e.g., 5:30), a list of the items from the order ticket 502 that are in-progress of being prepared, or the like. Moreover, the counter device 206 can create the order ticket 704 (which is associated with the order ticket 504) using data associated with the order ticket 504 from the order ticket data 220. As such, the order ticket 704 can include one or more of a name of the open ticket that the order ticket 504 was created for, an indication that the order ticket 504 has been in-progress of being prepared for a given time interval (e.g., 3:00), a list of the items from the order ticket 504 that are in-progress of being prepared, or the like.

In the example illustration of FIG. 7B, the kitchen display system 204 sends the counter device 206 order ticket updates 222 associated with the order ticket 502. For instance, the kitchen display system 204 can receive input indicating that the order ticket 502 is complete. Based on the input, the kitchen display system 204 can remove the order ticket 502 from the kitchen display user interface 216. The kitchen display system 204 can further send the counter device 206 order ticket updates 222 associated with the update to the order ticket 502 (e.g., data indicating that the order ticket 502 is complete). The counter device 206 can receive the order ticket updates 222 from the kitchen display system 204 and update the order tickets 702-704 in response. For instance, as illustrated in FIG. 7B, the counter device 206 updates the open ticket 702 to indicate that the order ticket 502 is complete.

Additionally or alternatively, in some examples, the counter device 206 can send data to the kitchen display system 204. For instance, the counter device 206 can receive input indicating that one or more of the open tickets 702-704 and/or one or more items on one of the open tickets 702-704 is complete. Based on the input, the counter device 206 can synchronize with the kitchen display system 204 by sending the kitchen display system 204 data indicating the updates to open tickets 702-704 (e.g., order ticket updates 230). The kitchen display system 204 can receive the data indicating the updates from the counter device 206 and update the open tickets 502-504 based on the data.

For instance, the counter device 206 can receive input indicating that the order ticket 702 is complete. Based on receiving the input, the counter device can send the kitchen display system 204 data indicating that the order ticket 502 on the kitchen display system 204 is complete. The kitchen display system 204 can receive the data from the counter device 206 and in response, update the kitchen display user interface 216 by removing the order ticket 502 from the kitchen display user interface 216.

Figure 8A:
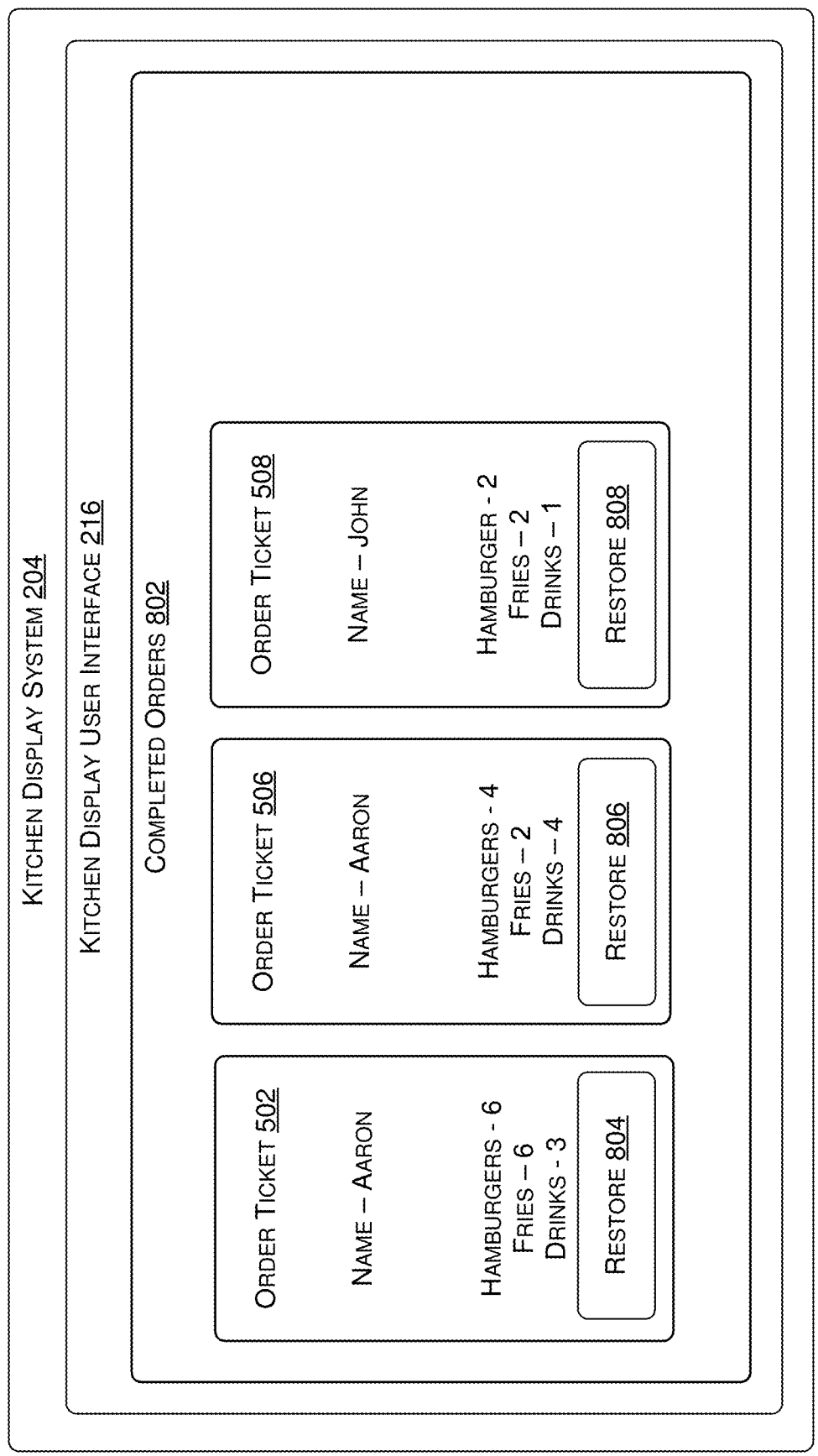
FIGS. 8A-8B are example illustrations of synchronizing restored customer orders between a kitchen display system and a counter device.
Figure 8B:
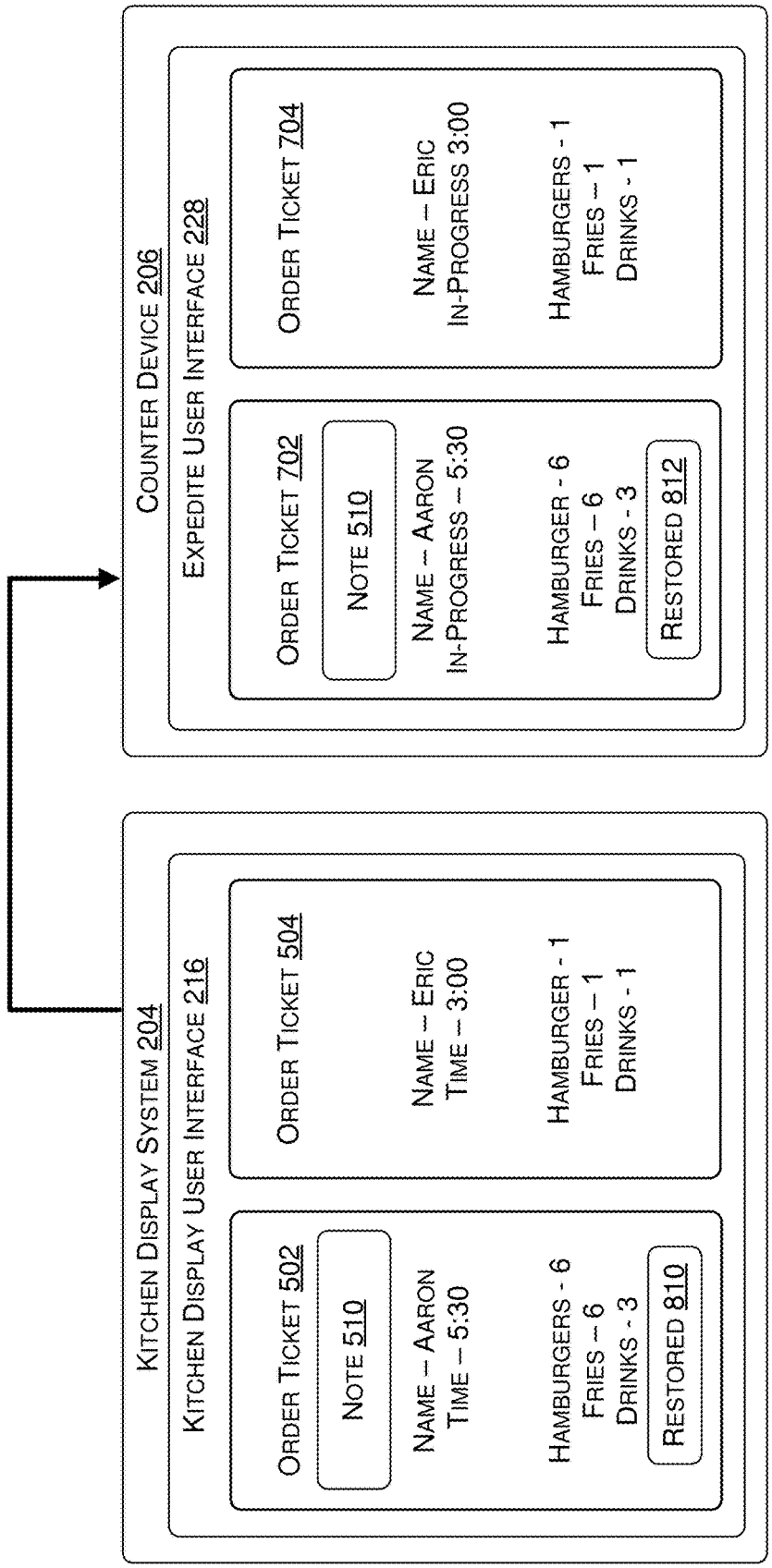

FIGS. 8A-8B are example illustrations of synchronizing restored customer orders between a kitchen display system and a counter device. For instance, in the example illustration of FIG. 8A, the kitchen display system 204 can receive input associated with the completed orders button 514 from FIG. 5. Based on the input, the kitchen display system 204 can provide completed orders 802 via the kitchen display user interface 216. In some examples, the completed orders 802 can include one or more order tickets 502, 506, and 508 that are now in "a complete" state. For instance, each of the order tickets 502, 506, and 508 may have previously been completed by the merchant.

A merchant can utilize the completed orders 802 to restore one or more of the order tickets 502, 506, and 508. For instance, in some examples, the merchant can select the restore button 804 to restore the order ticket 502, select the restore 806 button to restore the order ticket 506, and select the restore button 808 to restore the order ticket 508. In some examples, the restore buttons 804-808 will allow the merchant to restore only one or more items from the order tickets 502, 506, and 508, respectively. For instance, the merchant can utilize the restore button 804 to restore one or more hamburgers, fries, or drinks from the order ticket 502.

In the example illustrated in FIG. 8B, the kitchen display system 204 received input associated with the restore button 804 for the order ticket 502. Based on the input, the kitchen display system 204 can provide the order ticket 502 via the kitchen display user interface 216. In some examples, the kitchen display system 204 can further provide an indication that the open ticket 502 is restored 810. The kitchen display system 204 can then send the counter device 206 order ticket updates 222 associated with restoring the order ticket 502.

The counter device 206 can receive the order ticket updates 222 from the kitchen display system 204. Using the order ticket updates 222, the counter device 206 can update the order ticket 702 to include an indication that the order ticket 702 was restored 812. Additionally, the counter device 206 can further update the order ticket 702 with an indication that the order ticket has been in-progress for a given time period (e.g., 5:30).

It should be noted that, in some examples, the counter device 206 may provide completed order to the merchant for restoring. For instance, the counter device 206 can receive input indicating that an order ticket 702-704 that was previously completed should be restored, update the expedite user interface 228 based on the input, and send data associated with the update (e.g., order ticket updates 230) the kitchen display system 204. The kitchen display system 204 can then receive the data from the counter device 206 and based on the data, update the kitchen display user interface 216 with the restored order ticket.

Figure 9:
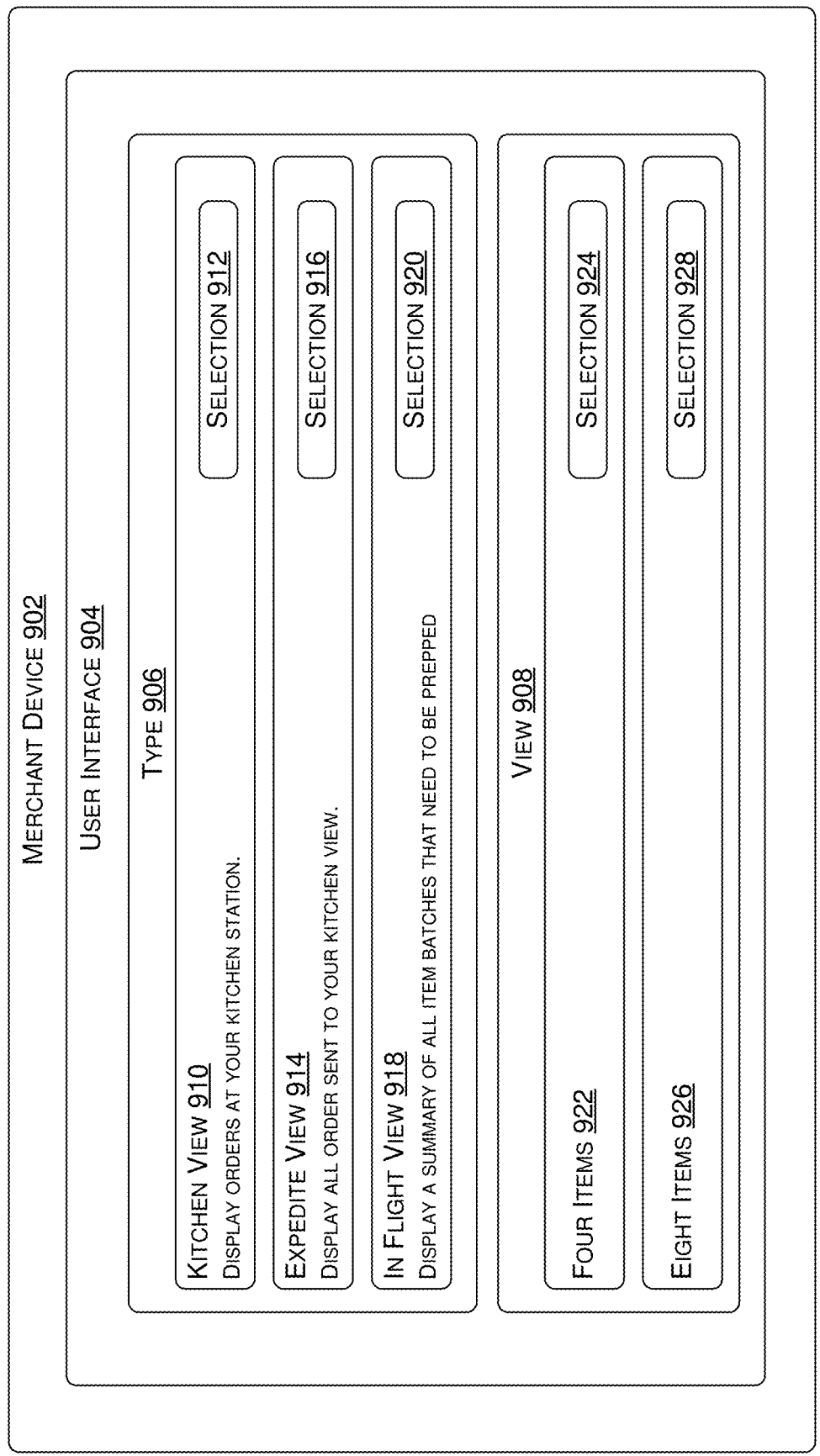
FIG. 9 is an example illustration of a merchant device providing a user interface for selecting a functionality type for the merchant device.

FIG. 9 is an example illustration of a merchant device providing a user interface for selecting a functionality type for the merchant device. In the example of FIG. 9, the merchant device can represent one of the merchant device(s) 108. In some examples, the merchant device 902 provides a user interface 904 for selecting both a type 906 of merchant device and a view 908 that is based on the type 906 of merchant device.

For instance, a merchant can select the kitchen view 910 using the selection button 912. The kitchen view 910 can cause the merchant device 902 to function similar to the kitchen display system 204 by displaying order tickets (e.g., order ticket 502-508) to the merchant via a kitchen display user interface (e.g., kitchen display user interface 216). The merchant can further select the expedite view 914 using the selection button 916. The expedite view 914 can cause the merchant device 902 to function similar to the counter device 206 by displaying order tickets (e.g., order tickets 702-704) to the merchant via an expedite user interface (e.g., expedite user interface 228). Additionally, the merchant can select the in flight view 918 using the selection button 920. The in flight view 918 can cause the merchant device 902 to function similar to the kitchen display system 204 by displaying both order tickets (e.g., order tickets 502-508) in an order ticket interface (e.g., order ticket interface 602) and a list of items (e.g., list of items 606) in an in flight interface (e.g., in flight interface 604) of a kitchen view user interface (e.g., kitchen view user interface 216).

The merchant can further select a view 908 that includes four items 922 using the selection button 924. The four items 922 view can cause the merchant device 902 to display four order tickets (e.g., order tickets 502-508 or order tickets 702-704) at a single time. Additionally, the merchant can select a view 908 that includes eight items 926 using the selection button 928. The eight items 926 view can cause the merchant device 902 to display eight order tickets (e.g., order tickets 502-508 or order tickets 702-704) at a single time.

It should be noted that, in some examples, the user interface 904 can include more than two different views 908 for selection. For instance, in some examples, the user interface 904 can include fewer and/or additional views 908 for selection by the merchant, where each of the views 908 includes a different number of items. For instance, the user interface 904 can include views 908 for one item, two items, nine items, or the like. Additionally, in some examples, the user interface 904 may include an input box where the merchant can input a number of items to include with respect to the view 908.

Figure 10:
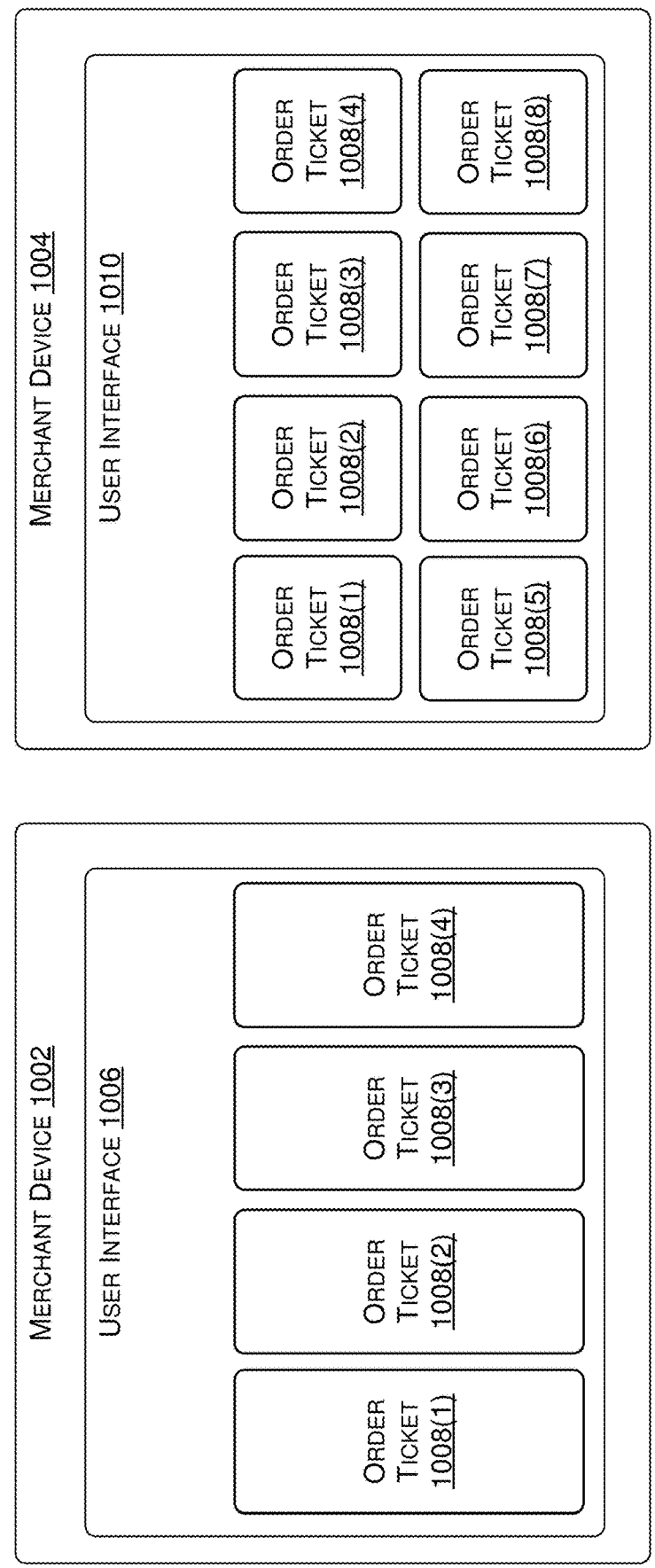
FIG. 10 is an example illustration of merchant devices providing various layouts for order tickets.

FIG. 10 is an example illustration of merchant devices providing various layouts for order tickets. In the example of FIG. 10, the merchant device 1002 and the merchant device 1004, which may each correspond to one of merchant device(s) 108, provide different layouts for order tickets. For instance, the merchant device 1002 provides a user interface 1006 that includes a layout of four order tickets 1008(1)-(4). Additionally, merchant device 1004 provides a user interface 1010 that includes a layout of eight order tickets 1008(1)-(8). In some examples, as illustrate in the example of FIG. 10, the order tickets 1008(1)-(8) can include a grid pattern. However, in some examples, the order tickets 1008(1)-(8) can include various patterns as selected by the merchant (e.g., a circular pattern).

Figure 11A:
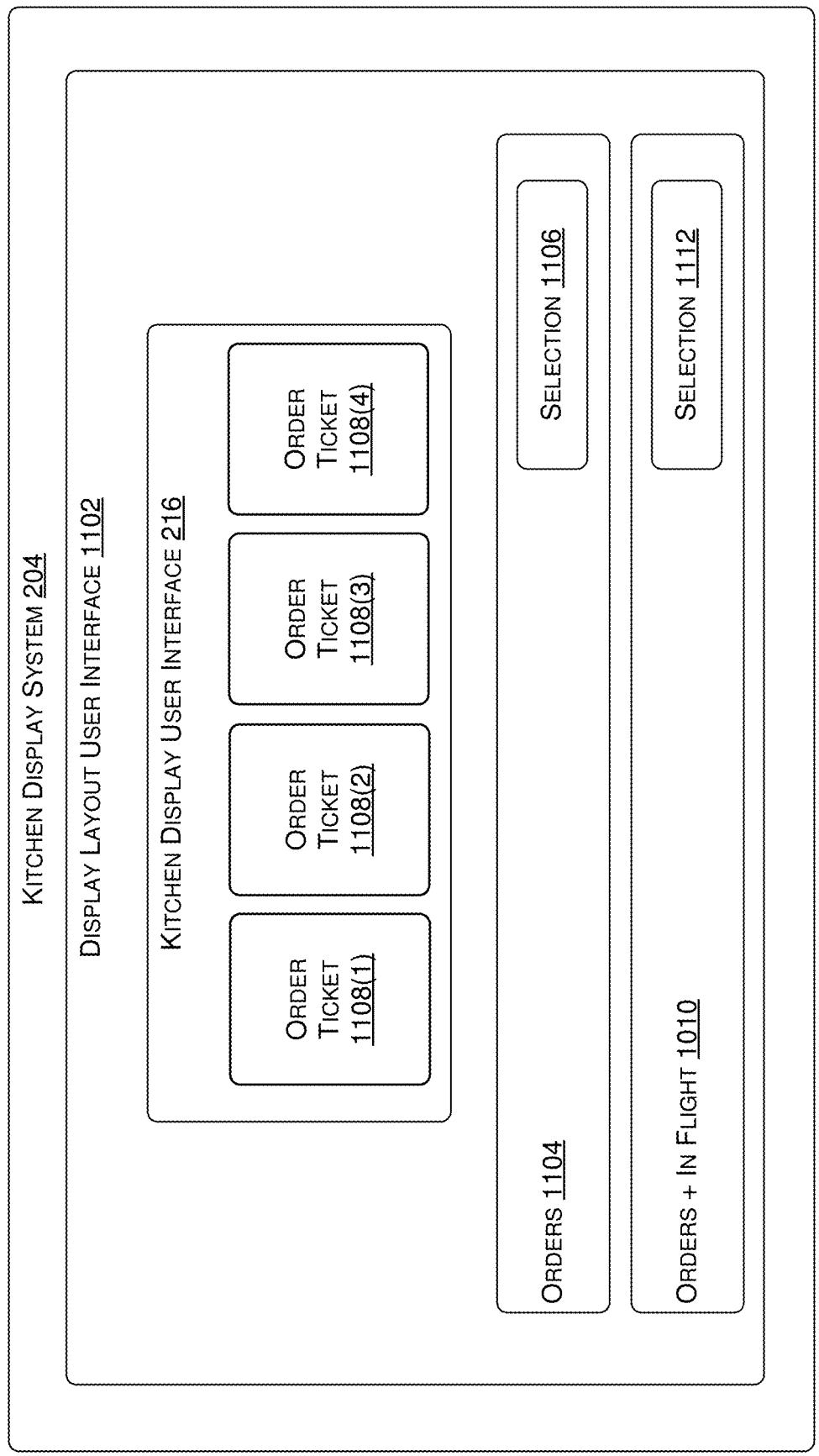
FIGS. 11A-11B are example illustrations of a kitchen display system providing a user interface for selecting a kitchen display configuration.
Figure 11B:
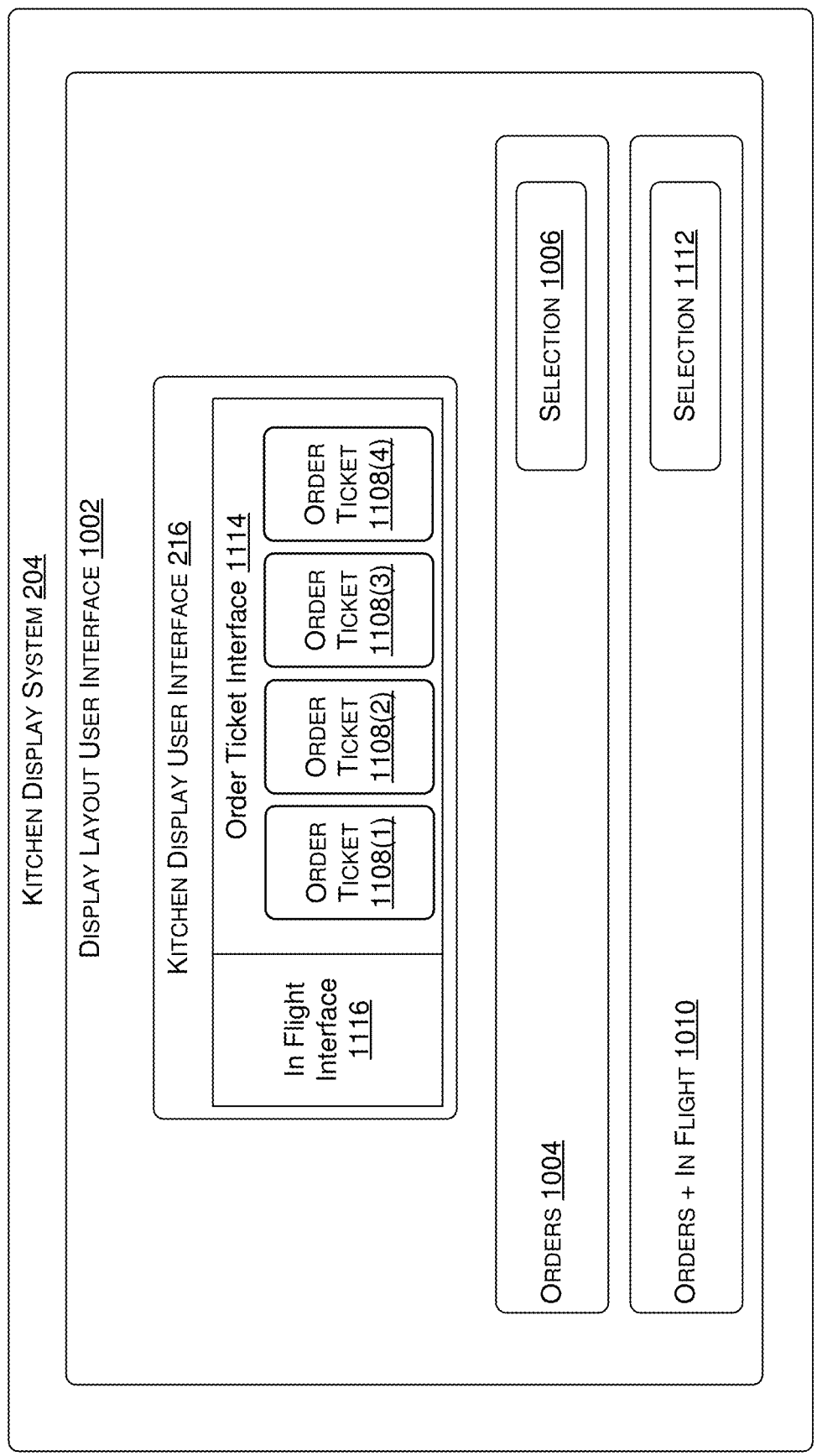

FIGS. 11A-11B are example illustrations of a kitchen display system providing a user interface for selecting a kitchen display configuration. For instance, in the example illustration of FIG. 11A, the kitchen display system 204 includes a display layout user interface 1102 for selecting the layout of the kitchen display user interface 216. For instance, the merchant can select orders 1104 using the selection button 1106. By selection orders 1104, the kitchen display user interface 216 only provides the order tickets 1108(1)-(4) to the merchant.

In the example illustration of FIG. 11B, the merchant can use the display layout user interface 1002 to select orders+in flight 1010 using the selection button 1012. By selecting orders+in flight 1010, the kitchen display user interface 216 provides both the order ticket interface 1114 and the in flight interface 1116, which can respectively represent the order ticket interface 602 and the in flight interface 604.

Figure 12:
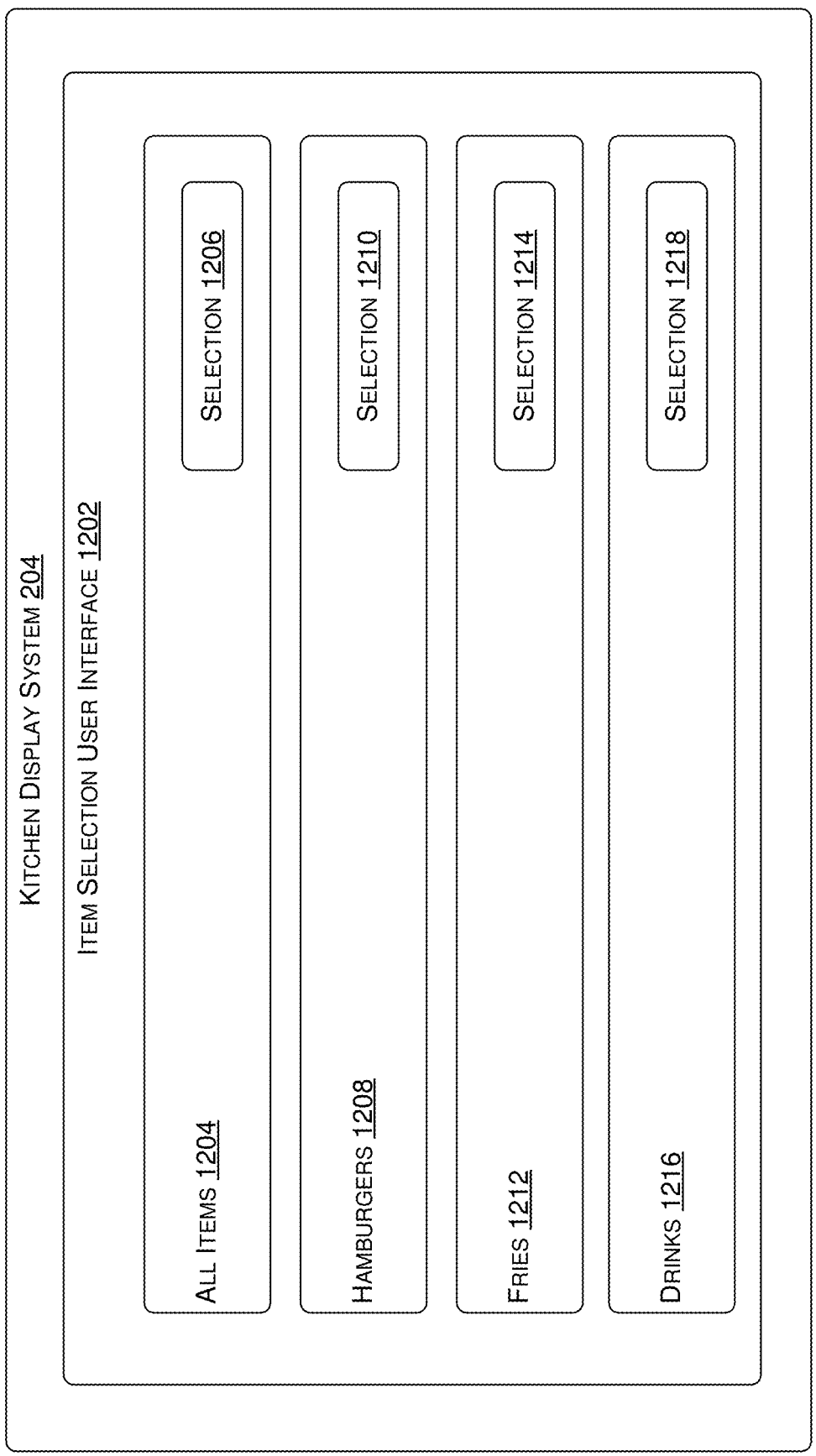
FIG. 12 is an example illustration of a kitchen display system providing a user interface for selecting a type of station associated with the kitchen display system.
Figure 13A:
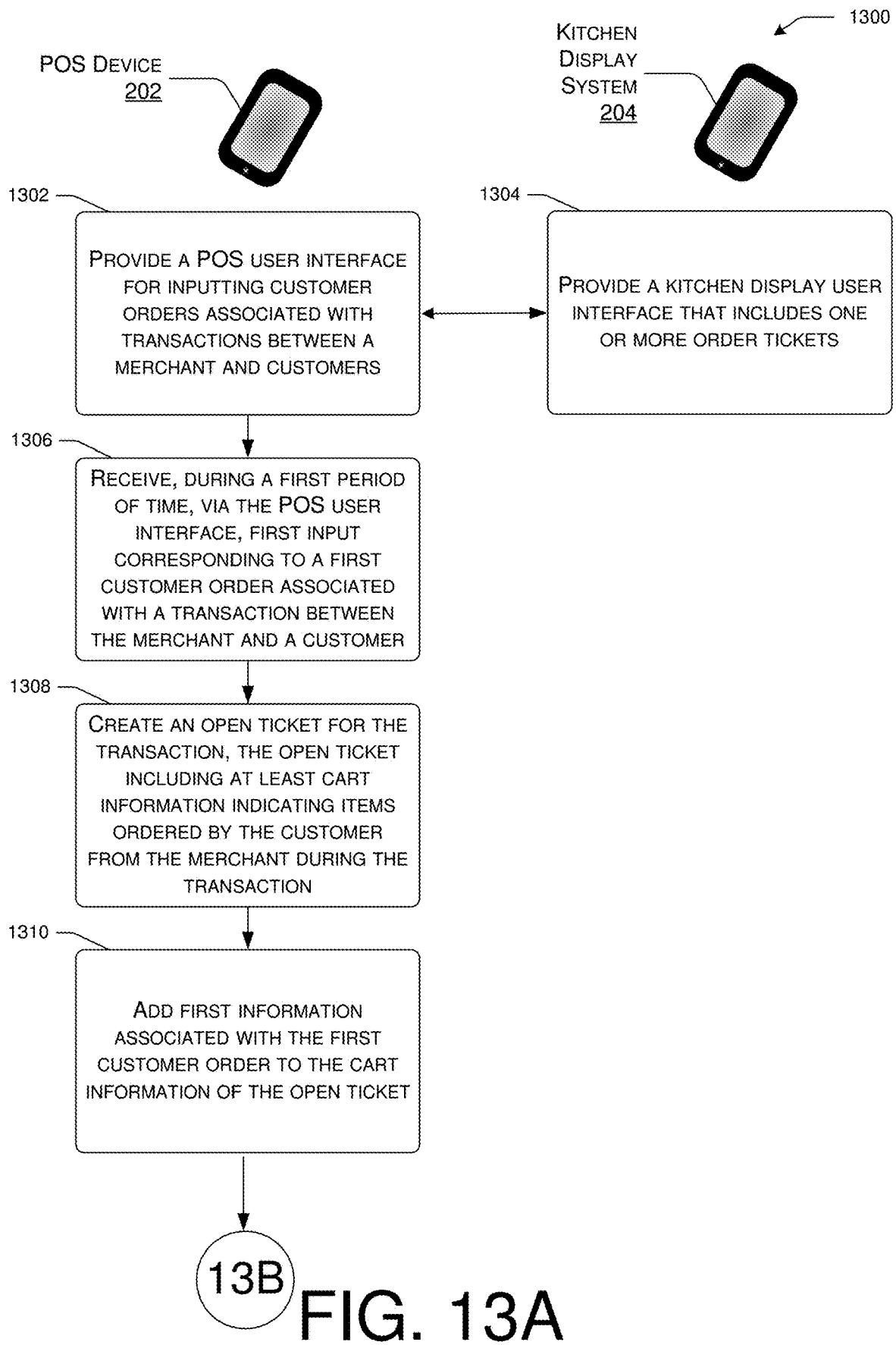
FIGS. 13A-13E are a flow diagram illustrating an example process for synchronizing open ticket functionality with a kitchen display system.
Figure 13B:
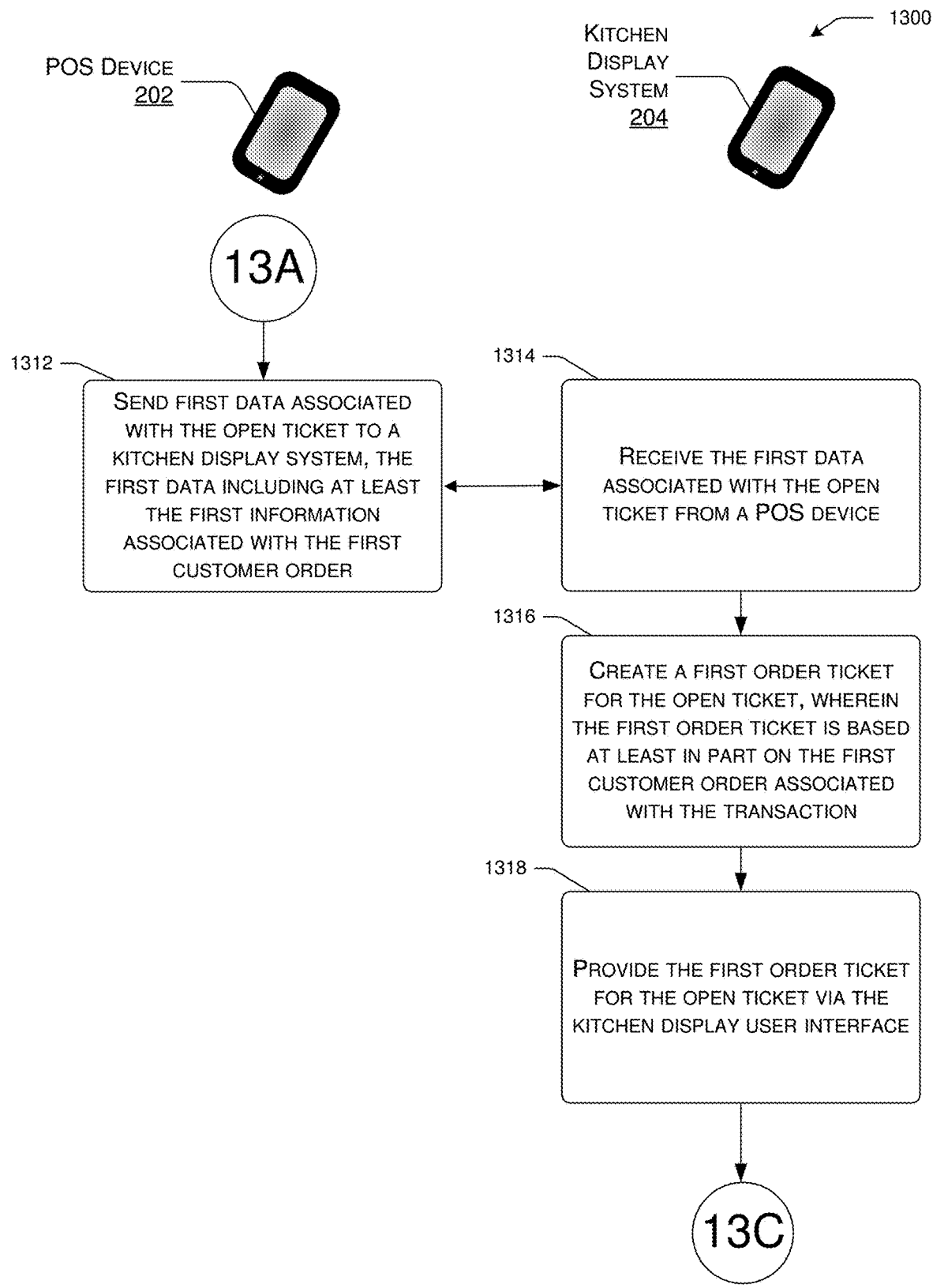
Figure 13C:
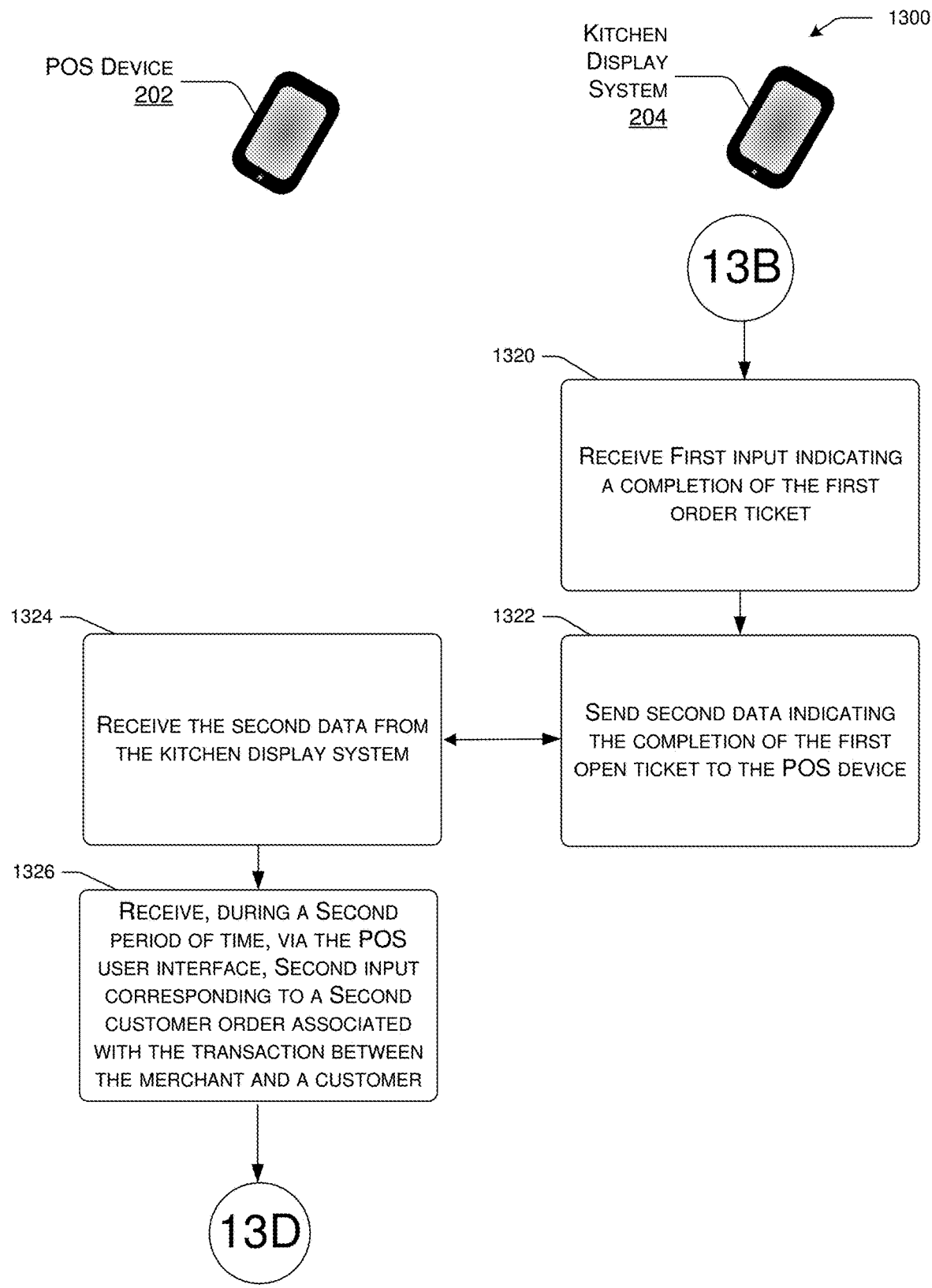
Figure 13D:
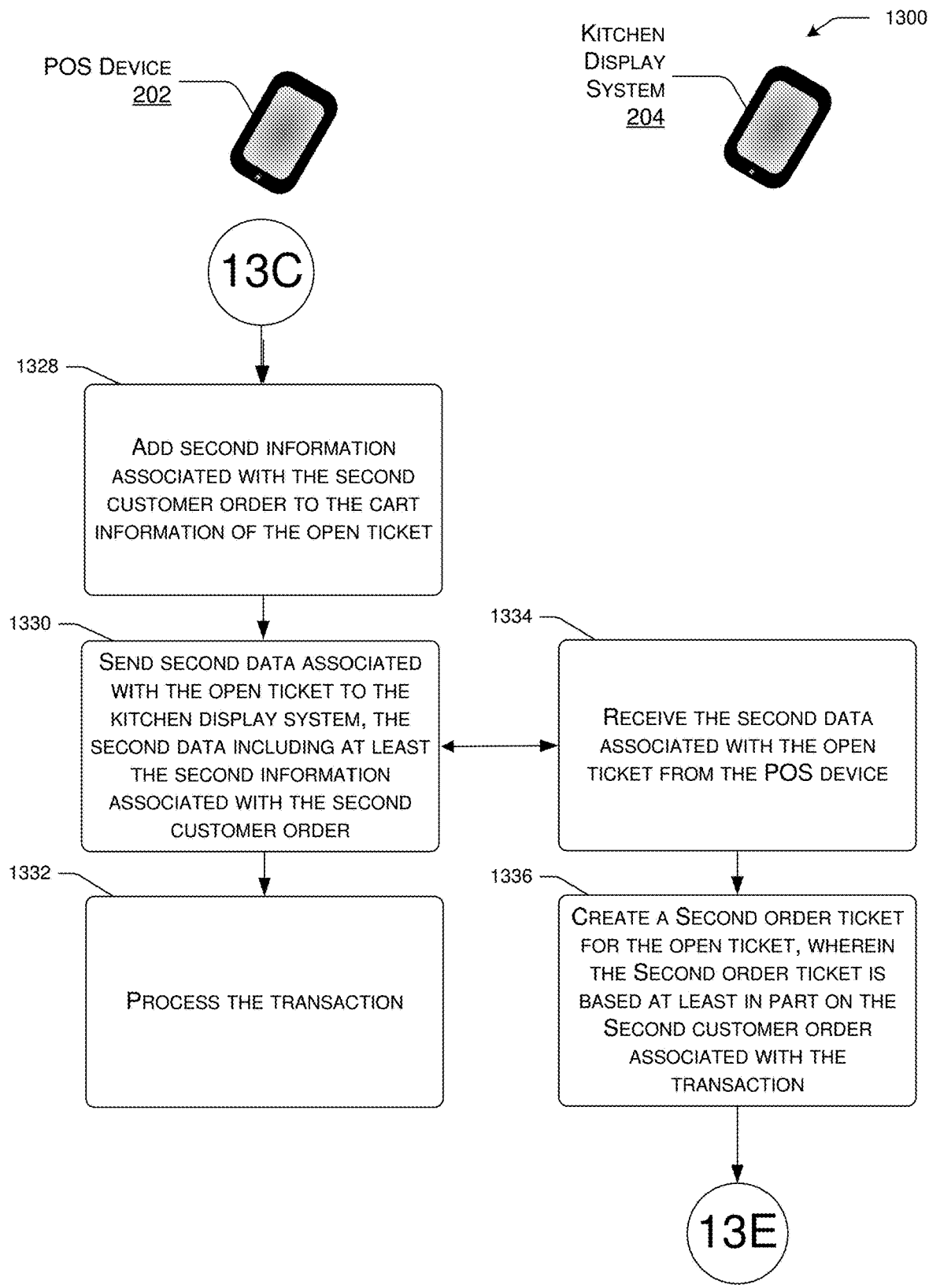
Figure 13E:
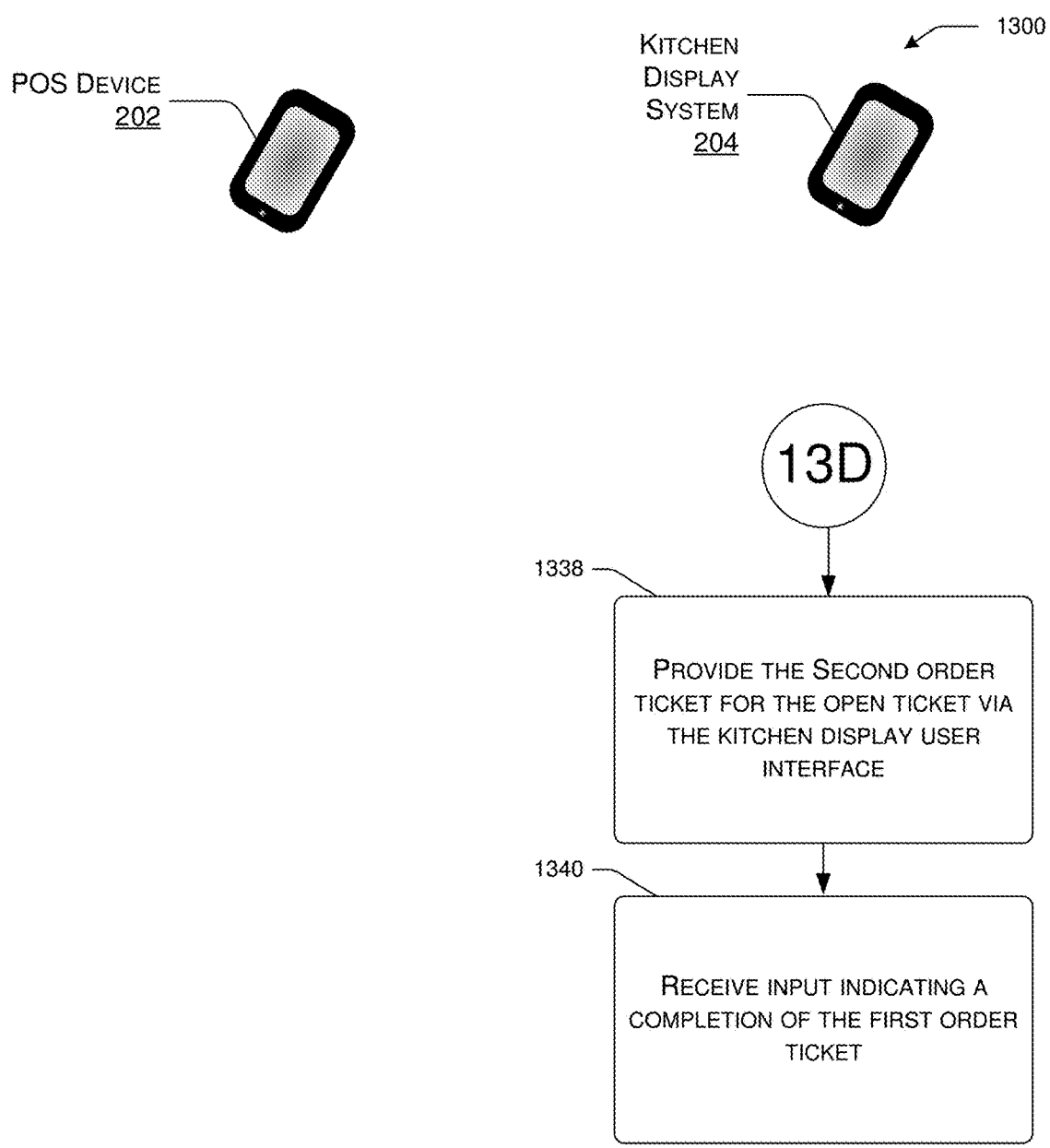

FIG. 12 is an example illustration of a kitchen display system providing a user interface for selecting a type of station associated with the kitchen display system. For instance, in the example of FIG. 12, the kitchen display system 204 provides an item selection user interface 1202 that a merchant can use to select which items order tickets (e.g., order tickets 502-508) include. For instance, the merchant can select the all items 1204 using the selection button 1206, select hamburgers 1208 using the selection button 1210, select fries 1212 using the selection button 1214, and/or select drinks 1216 using the selection button 1218. In some examples, based on selections made by the merchant, kitchen display system 204 will only provide order tickets that include the selected items.

It should be noted that the examples of FIGS. 4A-12 are for illustrative purposes only. In some examples, merchant devices can create order tickets (e.g., order tickets 502-508 and/or 702-704) that include fewer or additional items. Additionally, in some examples, the merchant devices can create order tickets (e.g., order tickets 502-508 and/or 702-704) that include items not illustrated in FIGS. 4A-12.

FIGS. 13A-13E are a flow diagram illustrating an example process for synchronizing open ticket functionality with a kitchen display system. The process 1300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 1300, and other processes described herein, may be performed by a POS device (e.g., POS device 202), a kitchen display system (e.g., kitchen display system 204), by another entity, or by a combination thereof.

At 1302, a POS device 202 provides a POS user interface for inputting customer orders associated with transactions between a merchant and customer. For instance, the POS device 202 can display the POS user interface via a display device of the POS device. In some examples, the merchant can use the POS interface to both input orders associated with transactions between the merchant and customers, and to process the transactions.

At 1304, a kitchen display system 204 provides a kitchen display user interface that includes one or more order tickets. For instance, the kitchen display system 204 can display the kitchen display user interface via a display device of the kitchen display system 204. The kitchen display user interface can include one or more order tickets, where each of the one or more order tickets correspond to an open ticket. In some examples, each of the one or more order tickets are in an "in-progress" state.

At 1306, the POS device 202 receives, during a first period of time, via the POS user interface, first input corresponding to a first customer order associated with a transaction between the merchant and a customer. In some examples, the first customer order includes at least a first item ordered by the customer from the merchant. In some examples, a kitchen of the merchant must prepare the first item for the customer.

At 1308, the POS device 202 creates an open ticket for the transaction, the open ticket including at least cart information indicating items ordered by the customer from the merchant during the transaction. For instance, the POS device 202 can create an open ticket data structure that stores information associated with interactions between the merchant and the customer during the transaction. In some examples, the information can include cart information that indicates items ordered by the customer from the merchant during the transaction.

At 1310, the POS device 202 adds first information associated with the first customer order to the cart information of the open ticket and at 1312, the POS device 202 sends first data associated with the open ticket to the kitchen display system 204, the first data including at least the first information associated with the first customer order. For instance, the POS device 202 can add first information associated with the customer order to the cart information of the open ticket data structure. The POS device 202 can then determine that the first customer order is complete and in response, send first data associated with the open ticket to the kitchen display system 204. In some examples, the first data includes at least the first information (e.g., indication of the first item) associated with the first customer order. In some examples, the first data further includes an associated versioning data structure associated with the open ticket.

At 1314, the kitchen display system 204 receives the first data associated with the open ticket from the POS device 202 and at 1316, the kitchen display system 204 creates a first order for the open ticket, wherein the first order ticket is based at least in part on the first customer order associated with the transaction. For instance, in some examples, the kitchen display system 204 can receive the first data associated with the open ticket from the POS device 202 and in response, determine that the open ticket includes a new open ticket based on the associated versioning data structure. The kitchen display system 204 can then create the first order ticket for the open ticket using the first data, wherein the first order ticket is based on the first customer order. For instance, the first order ticket can include an indication of the first item.

At 1318, the kitchen display system 204 provides the first order ticket for the open ticket via the kitchen display user interface. For instance, in some examples, the kitchen display system 204 can add the first order ticket to the one or more order tickets provided by the kitchen display user interface. In some examples, the kitchen display system 204 can further add an indication that the first order ticket is in an "in-progress" state.

At 1320, the kitchen display system 204 receives second input indicating a completion of the first order ticket and at 1322, the kitchen display system 204 sends second data indicating the completion of the first order ticket to the POS device 202. For instance, the kitchen display system 204 can receive first input from the merchant that the first order ticket (e.g., the first item) is complete. Based on the first input, the kitchen display system 204 can remove the first order ticket from the kitchen display user interface. Additionally, based on the first input, the kitchen display system 204 can send data indicating the completion of the first order ticket to the POS device 202.

At 1324, the POS device 202 receives the second data from the kitchen display system 204. In some examples, the POS device 202 uses the second data to update the open ticket for the transaction. For instance, the POS device 202 can add information to the open ticket data structure indicating that the first customer order is complete.

At 1326, the POS device 202 receives, during a second period of time, via the POS user interface, second input corresponding to a second customer order associated with the transaction between the merchant and the customer. In some examples, the second customer order includes at least a second item ordered by the customer from the merchant. In some examples, a kitchen of the merchant must prepare the second item for the customer.

At 1328, the POS device 202 adds second information associated with the second customer order to the cart information of the open ticket and at 1330, the POS device 202 sends second data associated with the open ticket to the kitchen display system 204, the second data including at least the second information associated with the second customer order. For instance, the POS device 202 can add second information associated with the customer order to the cart information of the open ticket data structure. The POS device 202 can then determine that the second customer order is complete and in response, send second data associated with the open ticket to the kitchen display system 204. In some examples, the second data includes at least the second information (e.g., indication of the second item) associated with the second customer order. In some examples, the second data further includes an updated associated versioning data structure associated with the open ticket.

At 1332, the POS device 202 processes the transaction. For instance, the POS device 202 can determine a final cost of the open ticket based on the first item and the second item. The POS device 202 can then communicate with a payment service (e.g., computing device(s) 112) in order to process the transaction for the customer. In some examples, to process the transaction, the POS device 202 sends the payment service payment information associated with a payment instrument of the customer for authorization for the cost of the transaction.

At 1334, the kitchen display system 204 receives the second data associated with the open ticket from the POS device 202 and at 1336, the kitchen display system 204 creates a second order for the open ticket, wherein the second order ticket is based at least in part on the second customer order associated with the transaction. For instance, in some examples, the kitchen display system 204 can receive the second data associated with the open ticket from the POS device 202 and in response, determine that the open ticket is updated based on the updated associated versioning data structure. The kitchen display system 204 can then create the second order ticket for the open ticket using the second data, wherein the second order ticket is based on the second customer order. For instance, the second order ticket can include an indication of the second item.

At 1338, the kitchen display system 204 provides the second order ticket for the open ticket via the kitchen display user interface. For instance, in some examples, the kitchen display system 204 can add the second order ticket to the one or more order tickets provided by the kitchen display user interface. In some examples, the kitchen display system 204 can further add an indication that the second order ticket is in an "in-progress" state.

At 1340, the kitchen display system 204 receives second input indicating a completion of the second order ticket. For instance, the kitchen display system 204 can receive second input from the merchant that the second order ticket (e.g., the second item) is complete. Based on the second input, the kitchen display system 204 can remove the second order ticket from the kitchen display user interface.

Figure 14:
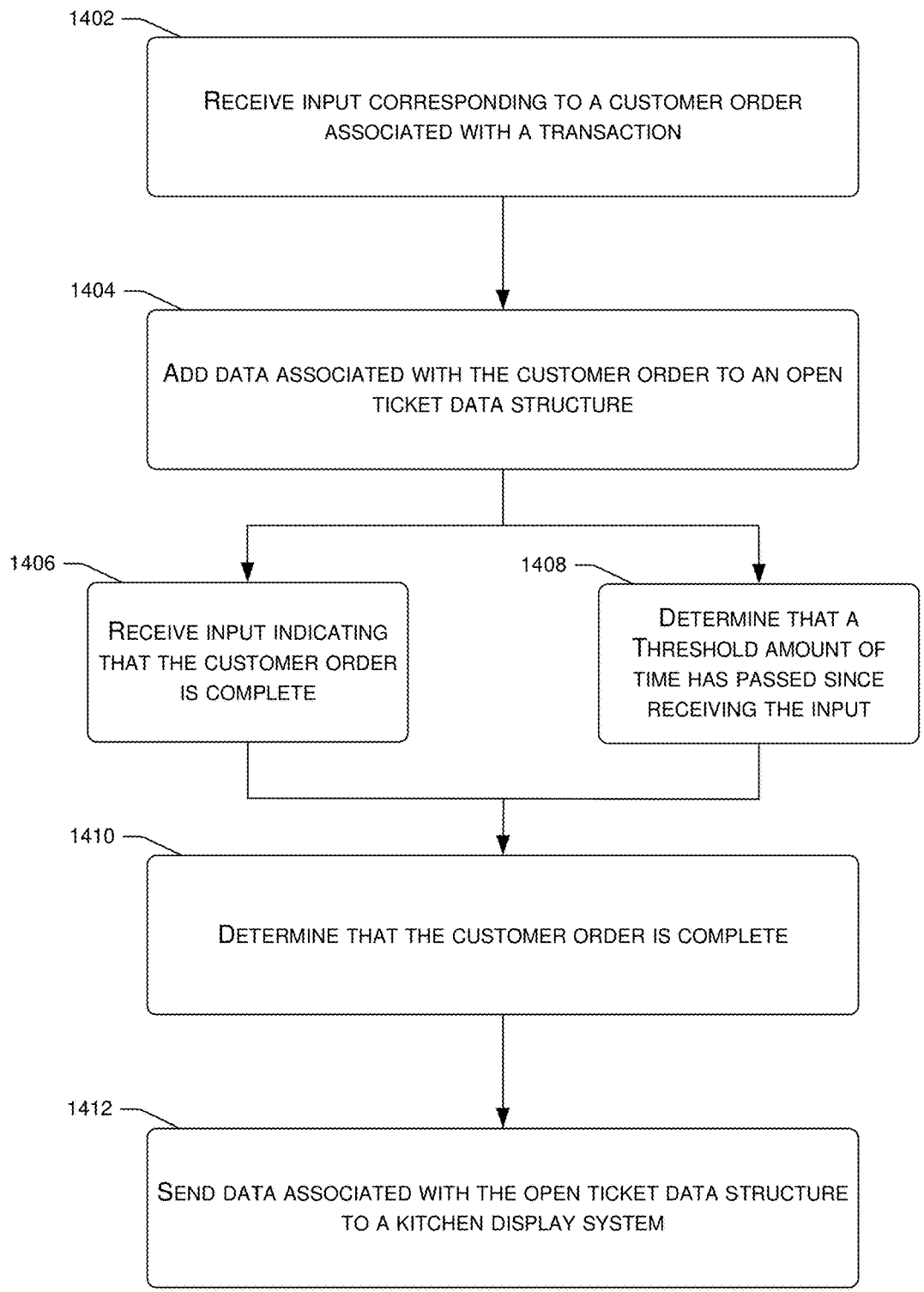
FIG. 14 is a flow diagram illustrating an example process for sending data associated with an open ticket to a kitchen display system based on a determination that a customer order for the open ticket is complete.

FIG. 14 is a flow diagram illustrating an example process 400 for sending data associated with an open ticket to a kitchen display system based on a determination that a customer order for the open ticket is complete. At 1402, the process 1400 receives input corresponding to a customer order associated with a transaction. For instance, a POS device can receive input from a merchant, where the input corresponds to one or more items ordered by a customer from the merchant during a transaction. In some examples, the POS device receives the input via a POS user interface.

At 1404, the process 1400 adds data associated with the customer order to an open ticket data structure. For instance, the POS device can add cart information associated with the customer order to cart data stored in the open ticket data structure. The cart information can indicate the one or more items ordered by the customer from the merchant during the transaction.

At 1406, the process 1400 receives input indicating that the first order is complete. For instance, the POS device can receive input from the merchant via the POS user interface that indicates that the customer order is complete.

Additionally or alternatively to 1406, at 1408, the process 1400 determines that a threshold amount of time has passed since receiving the input. For instance, the POS device can determine that a threshold amount of time has passed since receiving the input from the merchant. In some examples, the threshold amount of time can include a set interval. For instance, the threshold amount of time can include five second, thirty second, a minute, or the like. In some examples, the threshold amount of time may be based on items that are included in the customer order. For instance, the threshold amount of time may be longer at an ice cream shop since a customer may be more likely change his or her order for ice cream. However, the threshold amount of time may be shorter at a steakhouse since a customer may be less likely to change his or her order.

Based on 1406 and/or 1408, at 1410, the process 1400 determines that the customer order is complete. Then, at 1412, the process 1400 sends data associated with the open ticket data structure to a kitchen display system. For instance, the POS device can send data associated with the open ticket data structure to a kitchen display system based on determining that the customer order is complete. In some examples, the data can include information associated with the customer order. For instance, the data can indicate the one or more items ordered by the customer from the merchant.

Figure 15A:
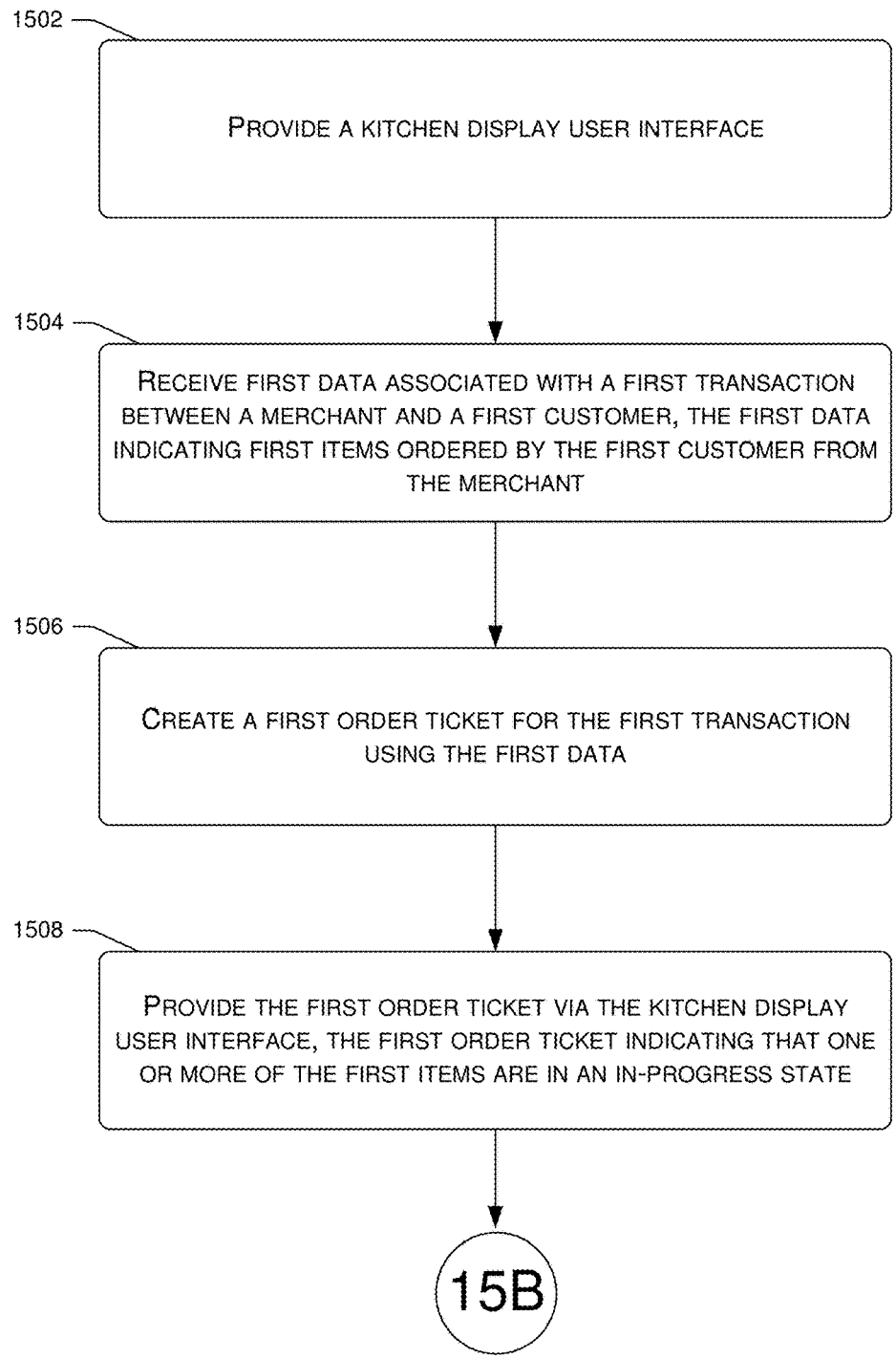
FIGS. 15A-15C are a flow diagram illustrating an example process of a kitchen display system generating and providing an in flight interface.
Figure 15B:
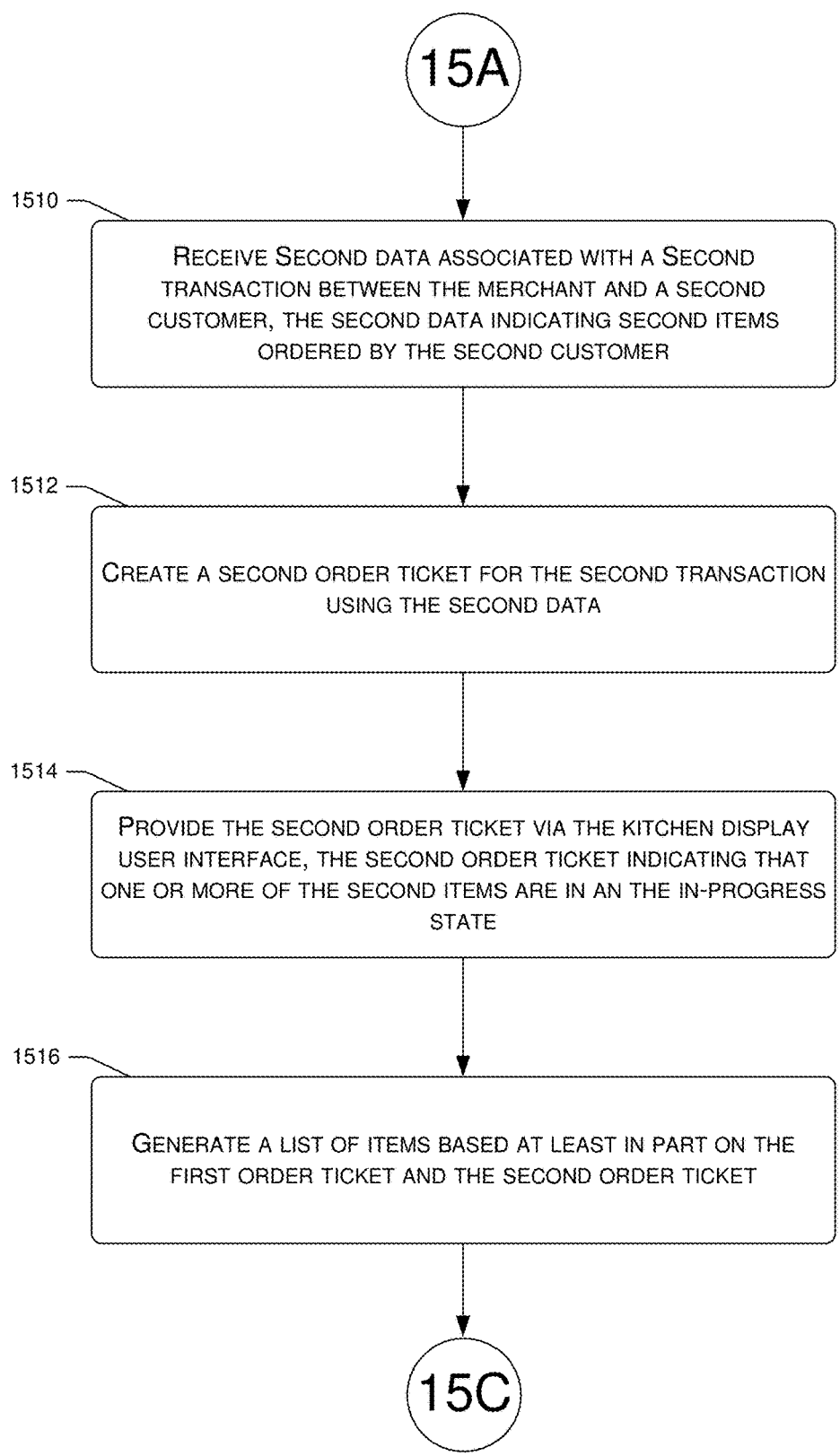
Figure 15C:
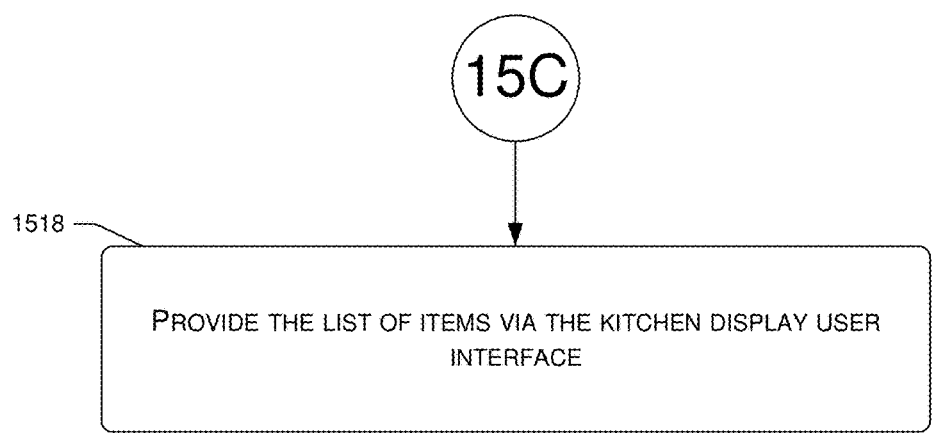

FIGS. 15A-15C are a flow diagram illustrating an example process of a kitchen display system generating and providing an in flight interface. At 1502, the process 1500 provides a kitchen display user interface. For instance, a kitchen display system can display the kitchen display user interface via a display device of the kitchen display system. The kitchen display user interface can include one or more order tickets, where each of the one or more order tickets correspond to an open ticket. In some examples, each of the one or more order tickets are in an "in-progress" state.

At 1504, the process 1500 receives first data associated with a first transaction between a merchant and a first customer, the first data indicating first items ordered by the first customer from the merchant. For instance, the kitchen display system can receive the first data associated with the first transaction from a POS device of the merchant. The first data can include first items ordered by the first customer from the merchant. In some examples, the first data can be associated with an open ticket for the first transaction.

At 1506, the process 1500 creates a first order ticket for the first transaction using the first data and at 1508, the process 1500 provides the first order ticket via the kitchen display user interface, the first order ticket indicating that one or more of the first items are in an in-progress state. For instance, based on receiving the first data, the kitchen display system can create the first order ticket using the first data. The kitchen display system can then add the first order ticket to the kitchen display user interface. In some examples, the first order ticket includes one or more indications that one or more of the first items are in-progress of being prepared by the merchant.

At 1510, the process 1500 receives second data associated with a second transaction between the merchant and a second customer, the second data indicating second items ordered by the second customer from the merchant. For instance, the kitchen display system can receive the second data associated with the second transaction from the POS device of the merchant. The second data can include second items ordered by the second customer from the merchant. In some examples, the second data can be associated with an open ticket for the second transaction.

At 1512, the process 1500 creates a second order ticket for the second transaction using the second data and at 1514, the process 1500 provides the second order ticket via the kitchen display user interface, the second order ticket indicating that one or more of the second items are in the in-progress state. For instance, based on receiving the second data, the kitchen display system can create the second order ticket using the second data. The kitchen display system can then add the second order ticket to the kitchen display user interface. In some examples, the second order ticket includes one or more indications that one or more of the second items are in-progress of being prepared by the merchant.

At 1516, the process 1500 generates a list of items based at least in part on the first order ticket and the second order ticket. For instance, the kitchen display system can generate the list of items by at least (1) identifying that the one or more of the first items from the first order ticket are in the in-progress state, (2) determining first item categories associated with the one or more of the first items from the first order ticket, (3) identifying that the one or more of the second items from the second order ticket are in the in-progress state, (4) determining second item categories associated with the one or more of the second items from the second order ticket, and (5) combining the one or more of the first items from the first order ticket with the one or more of the second items from the second order ticket based at least in part on the first item categories and the second item categories.

In some examples, the kitchen display system will further generate the list of items by ranking items within the list of items. For instance, the kitchen display system can rank the items included in the list of items based on at least one of (1) item categories that are included in the list of items, the item categories including at least the first item categories and the second item categories, (2) a number of items included in individual item categories from the item categories, or (3) preparation times associated the items included in the list of items.

At 1518, the process 1500 provides the list of items via the kitchen display user interface. For instance, the kitchen display system can add the list of items to the kitchen display user interface. In some examples, the kitchen display system adds the list of items to an in flight interface of the kitchen display user interface.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A method comprising:
receiving, by a point-of-sale (POS) device associated with a merchant, a request related to a first order of one or more first items, the request indicating at least one of a purchase order for or an intent to purchase the one or more first items, the request received from an application executing on a first customer computing device associated with a first customer;
receiving, via user input to a user interface of the POS device, a request related to a second order of one or more second items, the request associated with the first customer or a second customer and indicating at least one of a purchase order for or an intent to purchase the one or more second items;

sending, by the POS device to a kitchen display system (KDS) associated with the merchant, the first order and the second order;

aggregating, by the KDS, the first order and the second order; and responsive at least in part to aggregating the first order and the second order, causing presentation, by the KDS, of the first order and the second order.

2. The method of claim 1 further comprising:

generating, by the KDS, a first order ticket based on first data associated with the first order; and generating, by the KDS, a second order ticket based on second data associated with the second order, wherein causing presentation of the first order and the second order comprises at least causing presentation of the first order ticket and the second order ticket on a user interface of the KDS.

3. The method of claim 1, wherein causing presentation of the first order and the second order comprises displaying a list including at least the one or more first items and the one or more second items.

4. The method of claim 3 further comprising:

ranking, by the KDS, the one or more first items and the one or more second items included in the list based on at least one of item category, item preparation time, or a quantity of items included in an item category; and based at least in part on ranking the one or more first items and the one or more second items, sequencing, by the KDS, the one or more first items and the one or more second items for display.

5. The method of claim 1, wherein the application is a merchant application.

6. The method of claim 2 further comprising:

receiving, by the KDS, input indicating that the one or more first items are available;

determining, by the KDS, that the first order ticket is in a state different from an original state; and based at least in part on determining that the first order ticket is in a state different from the original state, modifying, by the KDS, presentation of the first order ticket on the user interface of the KDS.

7. The method of claim 6, wherein the state different from the original state comprises a complete state, and wherein modifying the presentation comprises removing the first order ticket from the user interface of the KDS.

8. The method of claim 1 further comprising:

receiving, by the POS device, a request related to a third order of one or more third items relevant to the first customer, the second customer, or a third customer;

sending, by the POS device to the KDS, the third order;

aggregating, by the KDS, the first order, the second order, and the third order; and causing presentation, by the KDS, of the first order, the second order, and the third order, wherein the presentation dynamically changes based at least in part a change in state of at least one of the first order, the second order, or the third order.

9. A system comprising:

one or more processors; and one or more non-transitory computer-readable media storing instructions executable by the one or more processors, wherein the instructions program the one or more processors to perform acts comprising:

receiving, by an order scheduling application executing on a point-of-sale (POS) device associated with a merchant, and from a first application executing on a first device, a first order comprising one or more first menu items to be prepared by the merchant;

receiving, by the order scheduling application executing on the POS device associated with the merchant via user input to a user interface of the POS device, a second order comprising one or more second menu items to be prepared by the merchant;

sending, by the order scheduling application to a second device, the first order and the second order;

aggregating, by the second device, the first order and the second order; and responsive at least in part to aggregating the first order and the second order, causing, by the second device, presentation of the one or more first menu items and the one or more second menu items.

10. The system of claim 9, wherein causing presentation of the one or more first menu items and the one or more second menu items comprises displaying a first order ticket and a second order ticket, wherein the first order ticket and the second order ticket are displayed adjacent to one another in a sequence.

11. The system of claim 9, wherein the merchant is a restaurant and causing presentation comprises causing presentation via a kitchen display user interface.

12. The method of claim 1, wherein causing presentation comprises causing presentation on a display of a prep station.

13. A kitchen display system (KDS) associated with a merchant comprising:

one or more processors; and one or more computer-readable media storing instructions that, when executed by the one or more processors, cause the one or more processors to perform operations comprising:

receiving, from a first application executing on at least one of a merchant device associated with the merchant or a device of a first customer, and via a point-of-sale (POS) device associated with a merchant, a first customer order associated with a first transaction between the merchant and the first customer, the first customer order associated with first data and including at least a first item;

receiving, from the POS device, a second customer order associated with a second transaction between the merchant and the first customer or a second customer, the second customer order associated with second data and including at least a second item, wherein the second customer order is input to a user interface of the POS device;

aggregating the first data and the second data; and responsive at least in part to aggregating the first data and the second data, causing presentation of the first data and the second data via a display system.

14. The KDS of claim 13, wherein the merchant is a restaurant, and wherein the display comprises a user interface of the KDS.

15. The KDS of claim 13 further comprising:

receiving, from the POS device, a request from a third application related to a third order of one or more third items relevant to the first customer, the second customer, or a third customer;

aggregating the first order, the second order, and the third order; and causing presentation of the first order, the second order, and the third order.

16. The KDS of claim 13, the operations further comprising grouping at least one of the first item or the second item based at least in part on item type and routing a particular group to one or more stations associated with the KDS.

17. The KDS of claim 14, the operations further comprising:
receiving input indicating that the first item is available;
determining that the first data is in a state that is different from an original state; and
based at least in part on determining that the first data is in the state that is different from the original state, modifying presentation of the first data on the display.

18. The KDS of claim 17, wherein the state that is different from the original state comprises a complete state, and wherein modifying the presentation comprises removing the first data from the display.

19. The KDS of claim 17, the operations further comprising:
based at least in part on determining that the first data is in the state that is different from the original state, causing synchronization of the first data between the KDS and at least one of the POS device or the merchant device.

20. The KDS of claim 17, the operations further comprising:
based at least in part on causing presentation of the first data and the second data via the display or determining that the first data is in the state that is different from the original state, synchronizing the first data and the second data between the display and another display.

* * * * *